US010419720B2

(12) United States Patent
Ashkenazi et al.

(10) Patent No.: US 10,419,720 B2
(45) Date of Patent: *Sep. 17, 2019

(54) SYSTEM AND METHOD FOR SHARING SENSED DATA BETWEEN REMOTE USERS

(71) Applicant: EVERYSIGHT LTD., Haifa (IL)

(72) Inventors: Asaf Ashkenazi, Hof-HaCarmel (IL); Hanan Shamir, Hof-HaCarmel (IL)

(73) Assignee: EVERYSIGHT LTD., Haifa (IL)

(*) Notice: Subject to any disclaimer, the term of this patent is extended or adjusted under 35 U.S.C. 154(b) by 0 days.

This patent is subject to a terminal disclaimer.

(21) Appl. No.: 15/996,658

(22) Filed: Jun. 4, 2018

(65) Prior Publication Data

US 2019/0052838 A1 Feb. 14, 2019

Related U.S. Application Data

(63) Continuation of application No. 15/673,921, filed on Aug. 10, 2017, now Pat. No. 9,992,449.

(51) Int. Cl.
*H04N 7/14* (2006.01)
*H04L 29/06* (2006.01)
*H04N 5/232* (2006.01)
*G06T 7/70* (2017.01)
*H04N 5/265* (2006.01)
*G06T 7/11* (2017.01)
*H04N 5/262* (2006.01)
*H04N 5/225* (2006.01)
*H04W 4/18* (2009.01)
*H04L 29/08* (2006.01)

(52) U.S. Cl.
CPC ............ *H04N 7/147* (2013.01); *G06T 7/11* (2017.01); *G06T 7/70* (2017.01); *H04L 67/18* (2013.01);

(Continued)

(58) Field of Classification Search
CPC .......... H04N 7/14; H04N 7/141; H04N 7/147; H04N 7/15; H04N 5/232238; H04N 5/23293; H04N 5/23206

(Continued)

(56) References Cited

U.S. PATENT DOCUMENTS 9,462,222 B2 * 10/2016 Border ............... G06K 9/00228
9,686,466 B1 * 6/2017 Billinghurst ....... H04N 5/23238
(Continued)

FOREIGN PATENT DOCUMENTS

WO WO 2017/130198 A1 8/2017

OTHER PUBLICATIONS

International Search Report of PCT Application No. PCT/IL2018/050881, dated Jan. 8, 2019.

*Primary Examiner* — Melur Ramakrishnaiah
(74) *Attorney, Agent, or Firm* — Pearl Cohen Zedek Latzer Baratz LLP

(57) ABSTRACT

A method and a system for sharing in video images, captured by a video image capturing device mounted on a source user and having a wide field of view, with a destination user, are provided herein. The method may include: receiving video images and respective positions and orientations thereof, captured by the video image capturing device at the source location; receiving a request from a destination user equipment, to view video images captured at the source location, wherein the request includes a line of sight of the destination user, as derived by an orientation sensor of a destination user headset; mapping the request to a respective region of interest of the destination user based on the line of sight; cropping the video images based on the respective region of interest and further based on said respective positions and orientations; and transmitting the cropped video images to the destination user.

20 Claims, 20 Drawing Sheets

(52) U.S. Cl.
CPC ........... *H04L 67/38* (2013.01); *H04N 5/2259* (2013.01); *H04N 5/23238* (2013.01); *H04N 5/265* (2013.01); *H04N 5/2628* (2013.01); *H04W 4/185* (2013.01)

(58) Field of Classification Search
USPC ............................................ 348/14.01–14.16
See application file for complete search history.

(56) References Cited

U.S. PATENT DOCUMENTS

| | | | |
|---|---|---|---|
| 2007/0273751 A1* | 11/2007 | Sachau | H04N 7/14 348/14.02 |
| 2011/0249073 A1 | 10/2011 | Cranfill et al. | |
| 2012/0274750 A1 | 11/2012 | Strong | |
| 2013/0083063 A1* | 4/2013 | Geisner | G06F 3/011 345/633 |
| 2013/0260360 A1 | 10/2013 | Baurmann et al. | |
| 2014/0245367 A1 | 8/2014 | Sasaki et al. | |
| 2015/0109401 A1 | 4/2015 | Kasatani et al. | |
| 2016/0093108 A1* | 3/2016 | Mao | A63F 13/42 345/633 |
| 2016/0255305 A1 | 9/2016 | Ritchey et al. | |
| 2016/0277712 A1 | 9/2016 | Michot | |
| 2016/0361658 A1 | 12/2016 | Osman et al. | |
| 2017/0032207 A1 | 2/2017 | Yoon et al. | |
| 2017/0061704 A1 | 3/2017 | Gewicke et al. | |
| 2017/0127023 A1 | 5/2017 | High et al. | |
| 2017/0244948 A1 | 8/2017 | Pang et al. | |
| 2018/0013980 A1 | 1/2018 | Oyman | |

* cited by examiner

SOURCE AND DESTINATION
START POINT

SOURCE

DESTINATION

Θ—ROLL ANGLE
φ—ELEVATION ANGLE
ψ—AZIMUTH

SOURCE AND DESTINATION
START POINT

1220A

1242

1240A

SOURCE

1220B

DESTINATION

1230B

Θ−ROLL ANGLE
φ−ELEVATION ANGLE
ψ−AZIMUTH 1244  1246  1242

1240B

DESTINATION START POINT

1310A

1340A

DESTINATION END POINT
(AZIMUTH ONLY)

1320B

DESTINATION END POINT
(ELEVATION ONLY)

1330B

Θ−ROLL ANGLE
φ−ELEVATION ANGLE
ψ−AZIMUTH

1340B

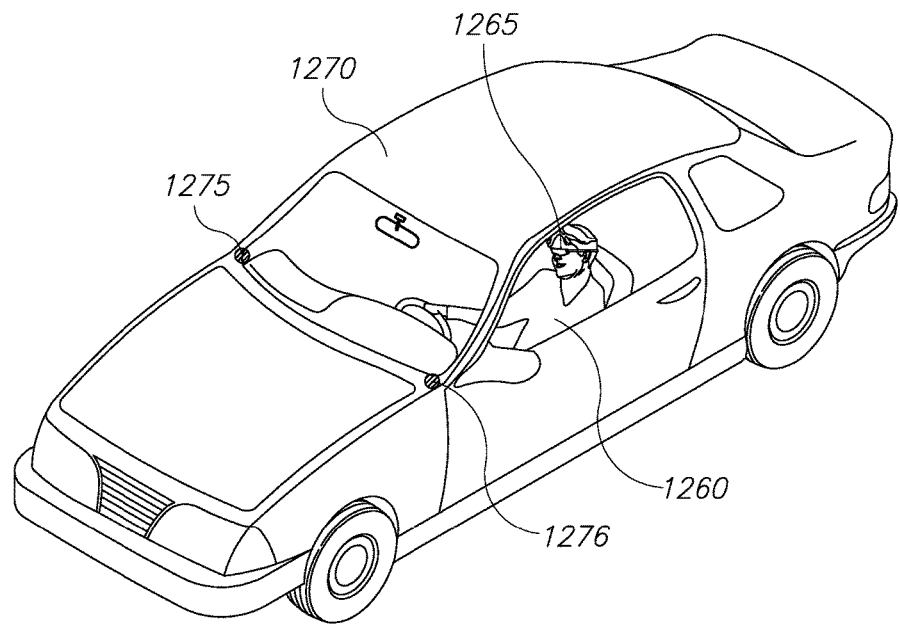
Figure 12A
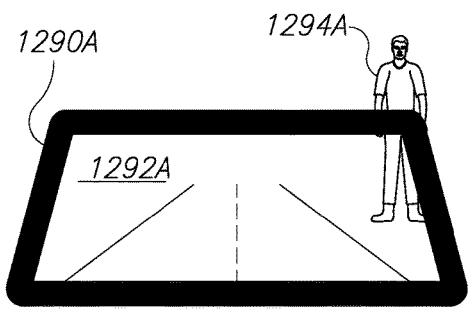 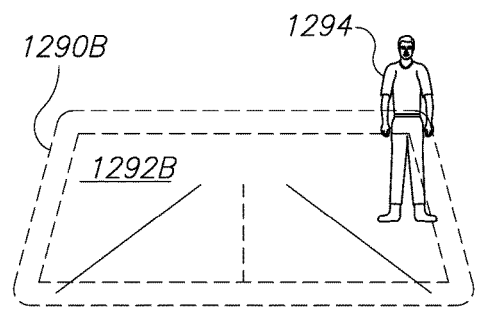
Figure 12B Figure 12C

SYSTEM AND METHOD FOR SHARING SENSED DATA BETWEEN REMOTE USERS

CROSS REFERENCE TO RELATED APPLICATIONS

This application is a Continuation of U.S. patent application Ser. No. 15/673,921, filed on Aug. 10, 2017 which is incorporated herewith in its entirety.

FIELD OF THE INVENTION

The present invention relates generally to the field of augmented reality systems, and more specifically, providing telepresence capability in same.

BACKGROUND OF THE INVENTION

Some systems have been proposed for sharing media (e.g. images and audio) between users in real time, for example in the field of gaming.

However, one of the most challenging tasks that has not yet properly addressed is to how to allow a first user to experience the appearance of the scene in which the second user is located at, as if the being there, while allowing the first user to maintain flexibility in choosing where and when to look.

SUMMARY OF THE INVENTION

Some embodiments of the present invention provide systems and methods for sharing media in real time in which a destination user is able to request wide angle media captured at a source location according to his line of sight. Such media may include images, for example captured by a camera with a wide field of view, or audio, for example captured by an omnidirectional microphone, or both.

According to some embodiments of the present invention, the media may then be cropped for transmission to the destination user so that the destination user may have a "tailored" media according to his needs or preference. The video steam can be cropped based on a region of interest and a specified line of sight and a respective audio stream may undergo beamforming so as to provide directional selection based on respective line of sight.

According to some embodiments of the present invention, both the source and the destination may be mobile rather than stationary, for example both may be comprised in headsets worn by individual users or other equipment worn by users, and may comprise for example transmitters and receivers respectively or devices with transmit and receive capability.

It will be appreciated that some embodiments of the invention may be used to provide "telepresence" to users, for example to transmit a sense of being in another location. According to some embodiments the presence of one user with another at a remote location may be simulated through the use of virtual graphic images or "avatars". Thus according to some embodiments of the invention, the presence of a source user may be simulated to a destination user or vice versa.

According to some embodiments of the present invention, in the case of images, the movement of one or both users can cause instability in displayed images and therefore it is desirable to compensate for this. Some embodiments of the invention provide a display method in which a video image is requested and the request includes a line of sight of a destination user, for example as derived by an orientation sensor of a headset. The orientation and/or position of the destination user at the time of receipt of a requested video image may be predicted. Then, when the requested video image is received, it may be modified to compensate for a difference between the predicted and actual orientation and/or destination. Alternatively or additionally, a received video image may be modified to compensate for movements at the source during the capture of an image. Similar stabilization and modification can be applied by beamforming techniques that render audio signal directional thereby simulating the direction of the audio source.

According to some embodiments of the present invention, a system for sharing in video images, captured by at least one video image capturing device with a wide field of view at a source location, with a destination user is provided herein. system comprising a data communication unit comprising one or more computer processors configured to: receive in real time a sequence of video images and respective positions and orientations thereof, captured by the at least one video image capturing device at said source location; receive at least one request, from a destination user equipment, to view video images captured at said source location, wherein the t least one request includes a line of sight of said destination user, as derived by an orientation sensor of a destination user headset; map the at least one request to a respective region of interest of said destination user based on said line of sight; and crop said sequence of video images based on the respective region of interest and further based on said respective positions and orientations, to yield cropped video images, wherein the data communication unit further comprises a transmitter to transmit the cropped video images for display to the destination user.

According to some embodiments of the present invention, the at least one video image capturing device with a wide field of view cover 360°.

According to some embodiments of the present invention, the data communication unit is configured to lock, in world coordinates the cropping to any of pan, tilt and roll of any of: a line of sight of the source user, predefined vector in a specified direction in world coordinates.

According to some embodiments of the present invention, the computer processor is configured to receive additional images of said source location from a source other than said at least one video capturing device and use said additional images to augment the sequence of video images displayed to said destination user.

According to some embodiments of the present invention, the video capturing device is comprised in a user wearable device and wherein said additional images are received from video capturing devices in additional user wearable devices.

According to some embodiments of the present invention, the computer processor is configured to select from images captured by different video capturing devices in response to a request, wherein said selection is based on any one or more of image quality, image content.

According to some embodiments of the present invention, the additional video images are received from a database of previously stored images of said source location.

According to some embodiments of the present invention, the video capturing device is comprised in a source user wearable device including a source user display and the at least one computer processor comprises displaying on said source user display a virtual graphic image of said destination user.

According to some embodiments of the present invention, the computer processor is configured to receive an instruction to display said virtual graphic image of said destination user within the source location, and in response, display on the source user display, portions of the virtual graphic image of said destination user that are covered by a line of sight of the source user wearing the source user display.

According to some embodiments of the present invention, the computer processor is configured to receive an instruction to display said virtual graphic image of said destination user within the source location in which a plurality of source users each wearing a respective source user display, and calculate, in response a location within the source location, which minimizes line of sight obstruction based on locations of the source users and lines of sight thereof.

According to some embodiments of the present invention, the computer processor is configured to receive signals from one or more sensors sensing movement of one or more limbs of said destination user and animating said virtual graphic image representing said destination user to imitate said movement.

According to some embodiments of the present invention, the computer processor is configured to receive signals from one or more sensors sensing movement of one or more limbs of said destination user and control an input device at the source location based on said movement.

According to some embodiments of the present invention, the computer processor is configured to: instruct the at least one video image capturing device at said source location to capture images of a physical object located at the source location, generate a 3D model of said physical object based on the captured images; present the 3D model to the destination user; and modify the presented 3D model based on input by the destination user.

According to some embodiments of the present invention, the destination user equipment comprises a destination user display and wherein the at least one computer processor is configured to display on said destination user display, a virtual graphic image representing said source user.

According to some embodiments of the present invention, the computer processor is configured to predict said ROI by predicting an orientation of the destination user at a time of receipt of the cropped sequence of video images based on tracking movement of said destination user headset.

According to some embodiments of the present invention, the computer processor is configured to compare the predicted and actual orientation of the destination user at the time of receipt of the cropped sequence of video images, and in a case that a difference in said predicted and actual orientations is below a predetermined threshold, transform the received cropped sequence of video images to compensate for movements of said at least one video image capturing device during capturing of video images and displaying the transformed cropped sequence of video images to the destination user.

According to some embodiments of the present invention, the computer processor is configured to compare the predicted and actual orientation of the destination user at the time of receipt of the cropped sequence of video images, and in a case that a difference in said predicted and actual orientations is below a predetermined threshold, display to said destination user a previously stored image corresponding to said actual orientation.

According to some embodiments of the present invention, the computer processor is configured to instruct storing video images every specified time stamp and to retrieve stored imaged in a case real time video images are not available from the video image capturing device at said source location.

According to some embodiments of the present invention, a method of sharing in video images, captured by at least one video image capturing device with a wide field of view at a source location, with a destination user is provided herein. The method may include the following steps: receiving in real time a sequence of video images and respective positions and orientations thereof, captured by the at least one video image capturing device at said source location; receiving requests, from a destination user equipment, to view video images captured at said source location, wherein said requests include a line of sight of said destination user, as derived by an orientation sensor of a destination user headset; mapping the requests to respective regions of interest (ROI) of said destination user based on said line of sight; cropping said sequence of video images based on said regions of interest and further based on said respective positions and orientations; and transmitting the cropped video images for display to the destination user.

According to some embodiments of the present invention, a non-transitory computer readable medium for sharing in video images, captured by at least one video image capturing device with a wide field of view at a source location, with a destination user is provided herein. The computer readable medium may include a set of instructions that when executed cause at least one computer processor to: receive in real time a sequence of video images and respective positions and orientations thereof, captured by the at least one video image capturing device at said source location; receive requests, from a destination user equipment, to view video images captured at said source location, wherein said requests include a line of sight of said destination user, as derived by an orientation sensor of a destination user headset; map the requests to respective regions of interest of said destination user based on said line of sight; crop said sequence of video images based on said regions of interest and further based on said respective positions and orientations; and instruct a transmission of the cropped video images for display to the destination user.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings:

FIGS. 12A-12C illustrating yet another aspect of some embodiments of the invention.

DETAILED DESCRIPTION OF THE INVENTION

Figure 1A:
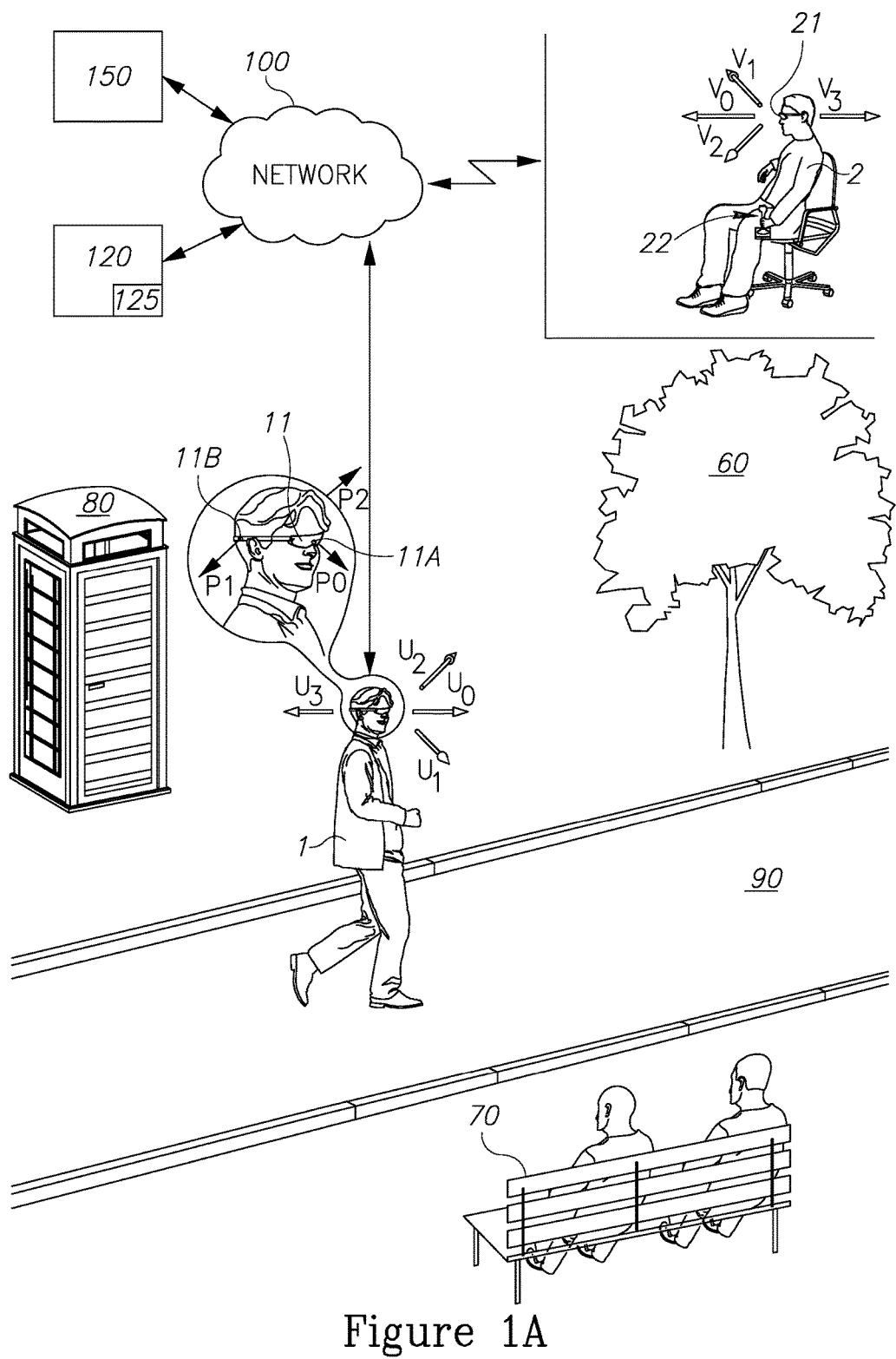
FIG. 1A is a schematic diagram illustrating a system for sharing video images according to some embodiments of the present invention.

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

FIG. 1A shows a system for sharing media according to some embodiments of the invention. In the system of FIG. 1A, a source user 1 is shown wearing a headset 11 and a destination user 2 is shown wearing a destination user headset 21. The headsets 11 and 21 may be part of source user equipment and destination user equipment respectively, which may include other components such as sensors worn on other parts of the body, peripheral devices such as cell phones and more, to be described in more detail herein. It will be understood that operations performed by headsets 11, 21 or components thereof described in the following may be performed by other parts of user equipment or may be components of user equipment other than a headset.

Source user headset 11 and possibly also the destination user headset 21 may include at least one video image capturing device and at least one audio capturing device or both, as is known in the art. Thus, in the system of FIG. 1A, images may be captured at a source location, which may be mobile for example as the source user 1 moves, by at least one video image capturing device 11A or 11B and additional video image capturing device (not shown) which forms part of source user equipment, shown in FIG. 1A as a headset. Similarly, sounds may be captured at the source location by at least one audio capturing device, which may also form part of the same source user equipment.

In some embodiments, video capturing device may comprise a single or a pair of video capturing device with a "fish eye" lens may be used so that 360° of the scene are captured. In such a case, image processing algorithms will be used to correct the distortion caused by the "fish eye" lens.

In some embodiments of the invention the source user 1 and destination user 2 may have similar equipment, so that the source user 1 may be the destination user 2 and vice versa. Thus, it will be appreciated that the terms "source" and "destination" are interchangeable and are used herein merely for the purpose of explanation.

Figure 3:
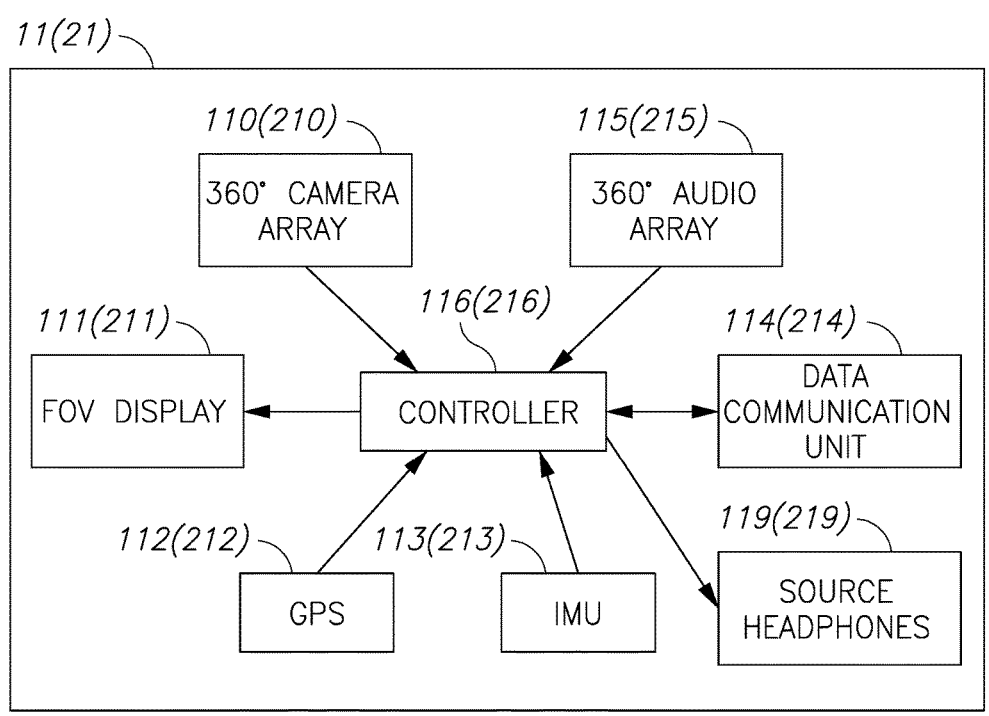
FIG. 3 is a block diagram of components in a user headset according to some embodiments of the invention.

Some components of a headset 11 or 21 according to some embodiments of the invention are shown in FIG. 3. The components of a headset 11 or 21 according to some embodiments of the invention may be the same as headsets known in the art, configured to operate according to embodiments of the invention. Thus, some embodiments of the invention provide a computer readable medium, transitory or non-transitory, comprising instructions which, when implemented in a processor in a data communication unit of a headset cause the processor to implement methods according to some embodiments of the invention.

It should also be noted that it is not a requirement for embodiments of the invention, unless otherwise stated herein, for the components shown in FIG. 3 to be part of a headset. In some embodiments of the invention the components may be distributed about the user in various ways as appropriate to the functionality of the component for example but not limited to in pockets, in peripheral devices such as mobile phones, attached to or embedded in clothing, attached to or embedded in parts of the body other than the head. Thus, the components shown in FIG. 3 are generally referred to as "user equipment" and the term "user equipment" may refer to one or more components, for example as shown in FIG. 3, carried by, embedded in, worn by or attached to a user.

Depending on the functionality provided to the source user 1 or the destination user 2, each may be provided with only a selection of components of user equipment or a selection of components of a headset as described herein. Thus, for example headsets used in some embodiments of the invention may include only the minimum components required to perform a particular function, for example to conserve space and thereby enable a more comfortable or stylish headset design.

In FIG. 3, components of a destination user headset 21 which may be identical or similar to corresponding components of source user headset 11 are shown in brackets. Thus, as shown in FIG. 3, a headset may comprise at least one video image capturing device, for example a 360° camera array 110 (210) or other wide field of view image capturing devices, possibly several sensors located in different locations, referred to herein as a camera for simplicity. The headset 11 (21) may further comprise a display 111 (211) which may be a wide field of view display, a global positioning system "GPS" unit 112 (212), an inertial measurement unit "IMU" 113 (213), a data communication unit 114 (214), 360° audio array 115 (215), a controller 116 (216) and speaker or headphones 119 (219).

It should be noted here that the field of view of a display in a headset may be about 70° to 90°. In some embodiments of the invention images captured at the source may cover a 360° field of view, although full 360° source imagery is not essential. The human vision system may concentrate at 30° to 50° field of view with anything outside this range being regarded as peripheral vision, often with degraded visual acuity. Similar audio directivity, adjusted per human characteristics may be achieved via audio beam forming.

In all embodiments of the invention unless otherwise stated the at least one video image capturing device may include a collection of individual image capturing devices arranged around a user's body, for example around or on top of his head, optionally as part of a headset 11 such as 11A and 11A and a third one is not shown as it is obstructed by the head of user 1) Alternatively, they can be located on his shoulder or at any other location.

In all embodiments of the present invention, on capturing the video images, for each image, the position and orientation from which the image was captured are recorded and later used as will be explained hereinafter in detail. Thus, for video imaging capturing devices 11A, position and orientation possibly vector P0 can be recorded, for video image capturing device 11B, P1 is recorded and P2 is similarly related to yet another video image capturing device (not shown).

According to some embodiments of the invention, images captured with a wide field of view may be cropped to a narrower field of view, for example based on line of sight (LOS) or orientation of a user. This cropping may be useful in bandwidth optimization. Any image captured with a wider field of view than the human vision system, e.g. wider than 50°, may be cropped in some embodiments of the invention. In some embodiments of the invention, the camera field of view may be 100° or more.

User equipment may include additional components not shown in FIG. 3 such as additional movement sensors for sensing movement of different parts of the body other than the head. This may allow telepresence emulation of a user by a virtual graphic representation, or "avatar", described further with reference to FIGS. 2A to 2C.

In the following only one video image capturing device is referred to, e.g. a camera, for simplicity of explanation, but it will be appreciated that in all embodiments it may be replaced by more than one such device and any kind of image capturing device may be used. Also in the following an audio array is referred to. This may be an omnidirectional array of microphones or any multidirectional audio capture device.

In the same way that a display may display to a user a narrower field of view than that captured by a camera, a speaker may output to a user directional sound, for example sound that has a narrower directional range than that captured by an omnidirectional microphone array. As indicated above, the equivalent of image cropping may be achieved for audio streams by beamforming.

As known in the art, in audio beamforming a computer processor may sample all microphone sensors arrays, and implement the required delays for each of the receiving microphones sensors. Then the microphones signals are added to construct a combined signal that is mostly sensitive to a certain direction. It is noted that sound merging from a certain direction, travels the free air space at a speed of about 300 meters per second, thus assuming for example an array of two microphones separated at a distance of 0.1 meter one from the other, more—as an example, assuming one would like to tune the beamformer for optimal sensitivity at a direction of 30 degrees from perpendicular to the line stretched between the two microphones, then the processor may need to implement a delay of 0.16 millisecond between the two signals of the microphones to compensate for the propagation delay (phase difference) of the sound wave traveling through free air, and then the processor will sum them up to construct the overall sound energy received from that direction. It may be appreciated that correlation methods may be implemented between the two phase corrected signals for better merging the two signal together in terms of signal to noise ratio across the signal spectrum.

According to some embodiments of the invention, at the same instant in time, a source user may have a directional media experience in reality defined by a first field of view at a specified location, whereas a destination user may be presented with a reproduced media experience captured at the same location defined by a second field of view different from the first field of view.

FIG. 1A shows source user 1 walking along a road 90. In front of him the road stretches to the horizon. In his peripheral vision, there is a tree 60 to his left and a park bench 70 to his right. Behind him is a telephone booth 80. Image capturing devices (cameras) 11A and 11B comprised in the source user headset 11 may "see" a wider field of view than user 1 is able to see and may be able to capture the view to the right, left and behind source user 1. These images, which are not in the field of view of source user 1, may be shared with the destination user 2. Thus, according to some embodiments of the invention, at the same time instant when the source user 1 is looking in one direction, e.g. at the road 90 ahead, the destination user 2 may have displayed to him an image captured in another direction, e.g. an image of the bench 70.

Similarly, the audio array 115 may capture sounds from multiple directions, such as the conversation of people sitting on the bench, and the rustling of leaves on the tree 60. If the source user is listening to music through headphones for example, he may not be listening to all the sounds around him but the destination user may be interested to hear these sounds. Alternatively, the source user may hear sounds from only one direction or from a limited range, preferably to align audio sources with the line of sight of the destination user (or more accurately the actual line of sight of the image stream presented to him). Thus according to some embodiments of the invention, at the same time instant when the source user 1 is hearing sound from one direction the destination user 2 may hear sound from another direction captured at the same location typically in a case where source user 1 and destination user 2 are presented with image streams associated with different directions.

For this purpose, the source user equipment including headset 11 and the destination user equipment including headset 21 may communicate via network 100 which may be any kind of mobile communication network known in the art, including but not limited to cellular networks operating according to any protocol such as 4$^{th}$ generation "4G", fifth generation "5G", wireless local area network "WLAN" at 2.4 GHz or 5 GHz and others.

Because the field of view of the headset 11 camera 110 is wide, images transmitted for sharing with the destination user 2 may be cropped for the narrower (human) field of view of the destination user 2. The manner of this cropping may be defined by the orientation of the destination user 2, as derived by an orientation sensor forming part of the destination user's headset 21, for example IMU 213. In a similar manner captured audio may be cropped according to direction, for example defined by LOS or orientation of the destination user 2.

Figure 1B:
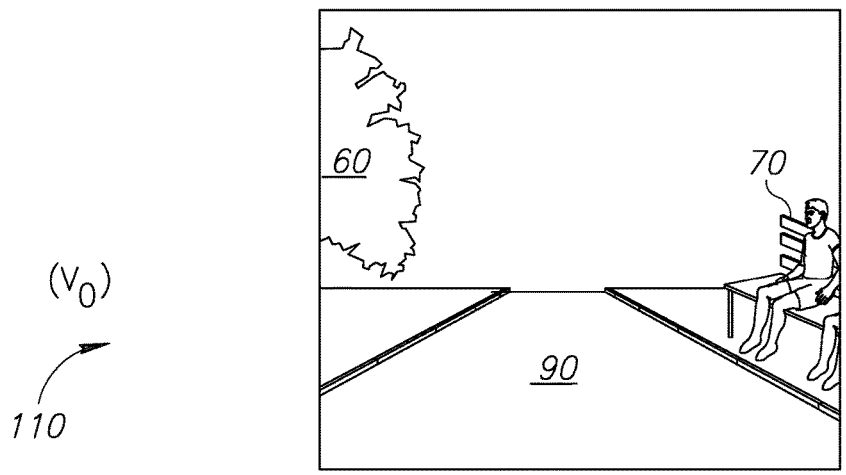
FIGS. 1B-1E are viewpoint diagrams illustrating field of view of users of a system for sharing video images according to some embodiments of the present invention.
Figure 1C:
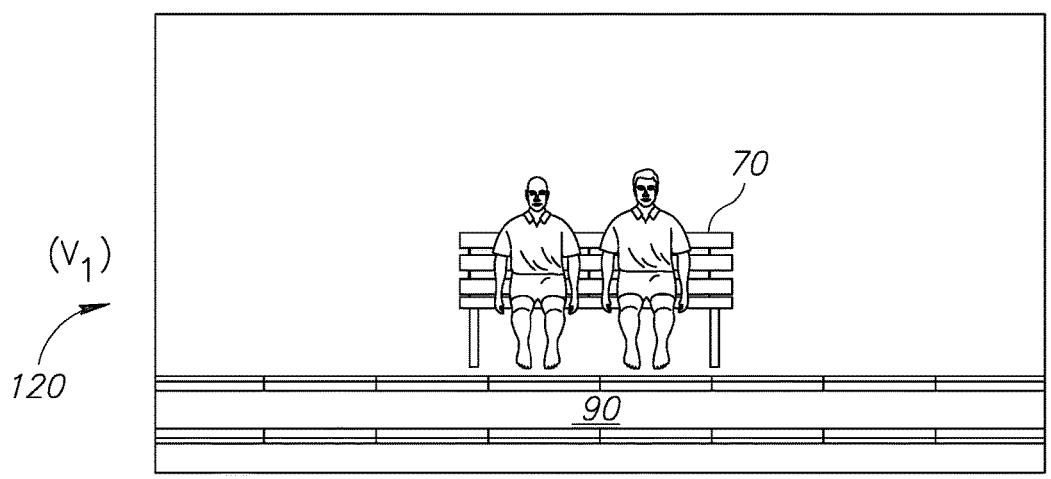
Figure 1D:
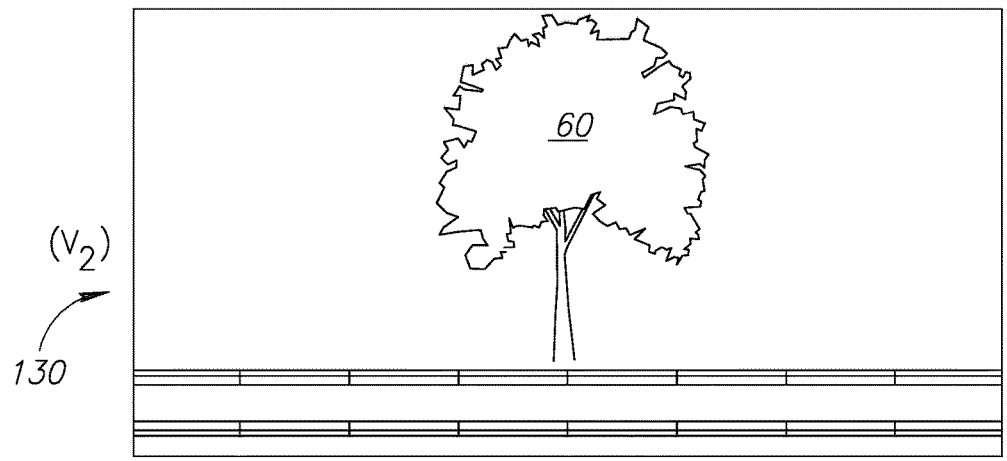
Figure 1E:
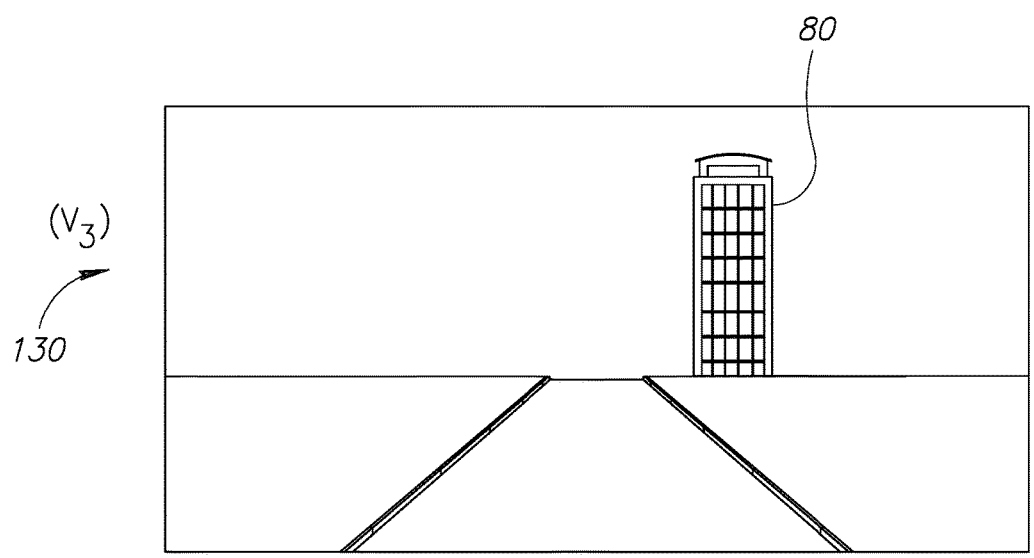

For the source user 1, the headset 11 may simply function as goggles and shield his eyes. Thus if the source user 1 looks straight ahead as indicated by vector $U_0$ he will see the road 90 ahead as shown in FIG. 1B with the tree 60 and bench 70 in his peripheral vision, if he looks to the right as indicated by vector $U_1$ he will see the whole of the bench 70 as shown in FIG. 1C, if he looks to the left as indicated by vector $U_2$ he will see the tree 60 as shown in FIG. 1D and if he turns and looks behind him as indicated by vector $U_3$ he will see telephone booth 80 as shown in FIG. 1E. In an analogous manner, a source user may hear sounds only in a certain directional range.

For the destination user, the headset 21 may display to the destination user 2 a cropped sequence of images captured by a camera in the headset 11 of the source user 1 and/or a limited directional range of audio information from audio array 115. For this purpose data communication unit 114 may receive requests from destination user equipment at the destination user's location, e.g. from data communication unit 214, to view video images or hear audio captured at a source location, for example the current location of the source user 1. The requests may arrive frame by frame or less frequently.

Each request may include a line of sight of destination user 2 associated, for example with his earth coordinates or any other positioning frame of reference, wherein the orientation vector may be derived by an orientation sensor in the headset 21 of the destination user such as IMU 213. The requests may be mapped to a region of interest "ROI" of the destination user 2, for example by one or more processors in data communication unit 114.

Operations performed by data communication unit 114 may be performed by one or more processors in data communication unit 114 and may alternatively be implemented in a remote computing device such as a server 120 communicating with source user equipment and destination user equipment via the network 100. In the following it will be assumed that the mapping is performed by data communication unit 114 but it will be appreciated that any operations of data communication unit 114 may be performed in a remote computing device.

Having mapped the requests to a ROI, the data communication unit 114 may crop the sequence of images according to the ROI and may then transmit them to the destination user 2.

Thus, if the destination user looks straight ahead as indicated by vector $V_0$ he may have displayed to him an image of the road 90 ahead similar to the view shown in FIG. 1B with the tree 60 and bench 70 in his peripheral vision. Additionally, or alternatively he may hear sounds from the forward direction. If he turns his head to the right as indicated by vector $V_1$ he may see an image of the whole of the bench 70 similar to the view shown in FIG. 1C and/or hear the people on the bench speaking, if he turns his head to the left as indicated by vector $V_2$ he may see an image of the tree 60 similar to the view shown in FIG. 1D and/or hear the leaves rustling and if he turns his head as if to look behind him as indicated by vector $V_3$ he will see an image of the telephone booth 80 behind source user 1 (similar to the view shown in FIG. 1E) and/or hear sounds from the telephone booth.

The images or audio or both presented to the destination user 2 may be irrespective of the current line of sight of the source user 1. Thus, systems and methods according to some embodiments of the invention may compensate for changes in orientation or line of sight of source user 1 so that the cropped sequence of images presented to the destination user 2 is not affected by movements of source user 1.

Locking Destination User View to the Source User

Figure 1F:
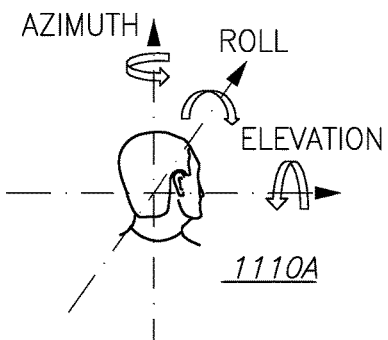
FIGS. 1F-1H are diagrams illustrating field of view of users as affected by position and orientation of same according to one aspect of a system for sharing video images according to some embodiments of the present invention.
Figure 1F:
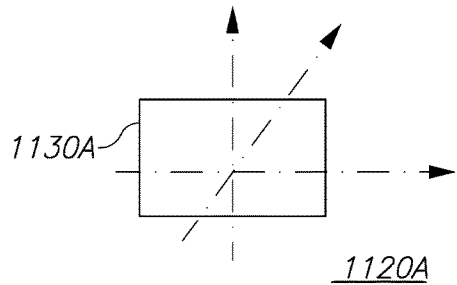
Figure 1F:
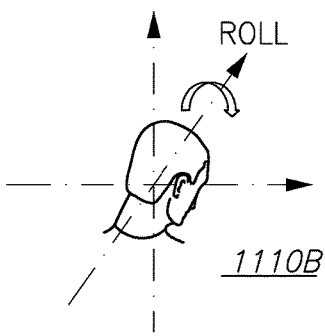
Figure 1F:
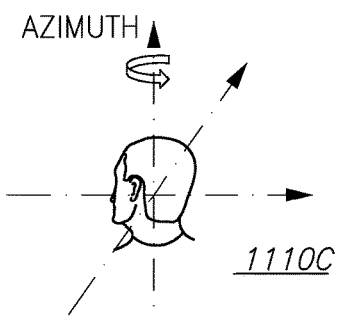
Figure 1F:
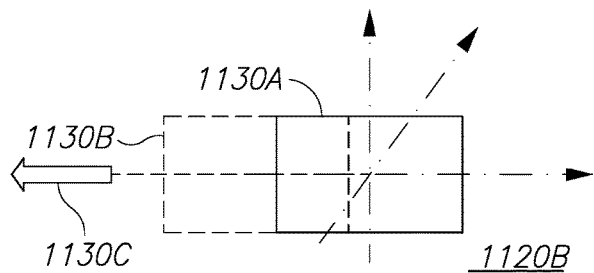
Figure 1G:
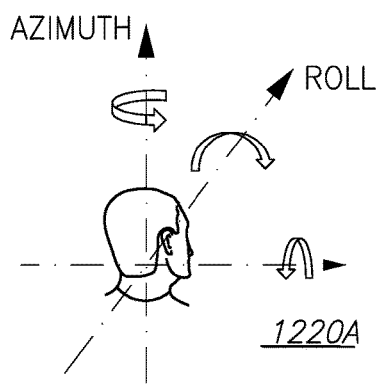
Figure 1G:
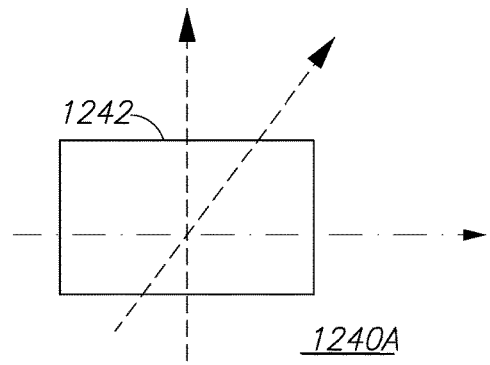
Figure 1G:
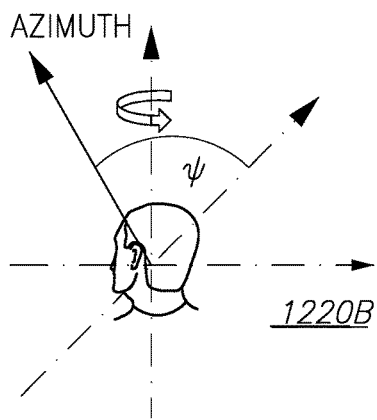
Figure 1G:
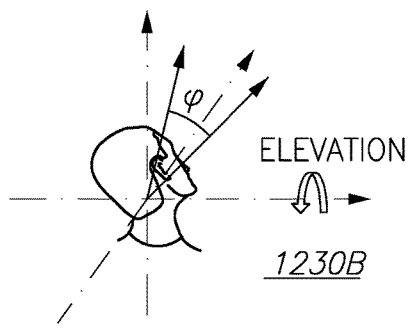
Figure 1G:
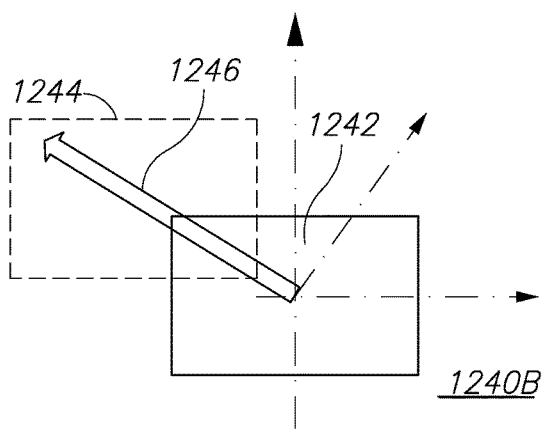
Figure 1H:
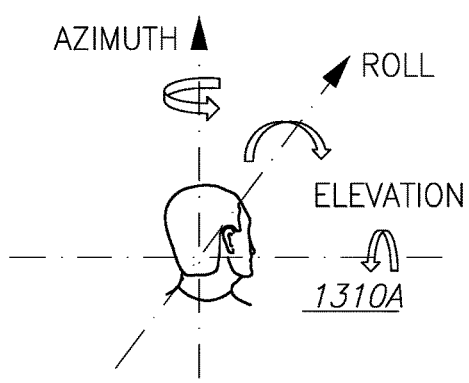
Figure 1H:
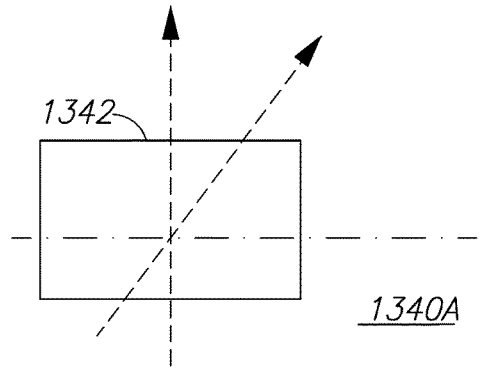
Figure 1H:
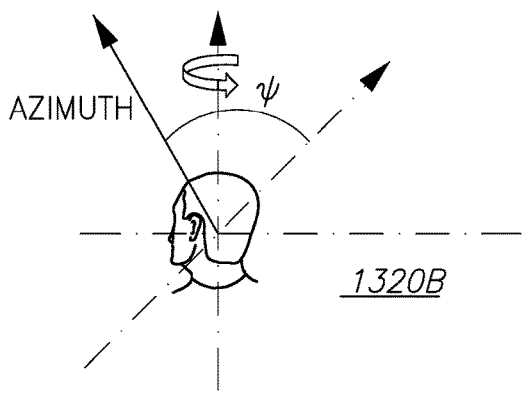
Figure 1H:
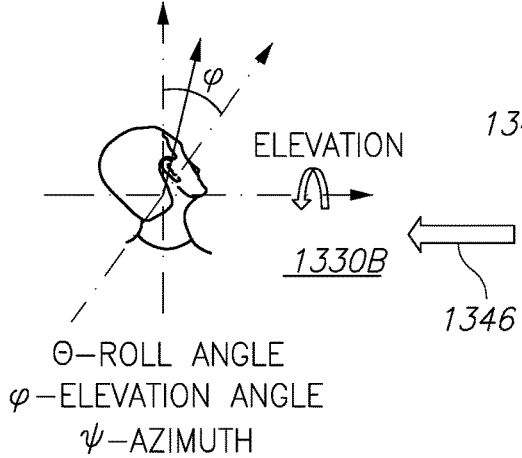
Figure 1H:
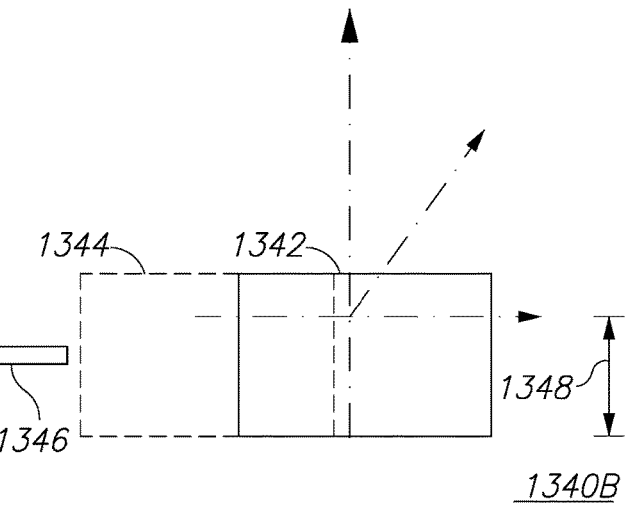

FIGS. 1F-1H are diagrams illustrating field of views of the destination user as affected by position and orientation of same according to one aspect of a system for sharing video images according some embodiments of the present invention.

In FIG. 1F, an initial orientation of destination user is given in an axial diagram 1110A and a respective viewpoint transmitted to him via source user is given in diagram 1120A. In a case that the destination user chooses to lock his view to only roll and elevation of the source user, in a case that the destination user rolls as shown in axial diagram 1110B (position B) the viewpoint transmitted to him from source user is identical to that of the source user as shown in diagram 1120B. This is because the roll has been locked and any change in roll axis of the destination user will not affect the view point form the source. On the other hand, in case the destination user changes its azimuth as shown in axial diagram 1110C, since destination user has not locked his view to the azimuth of source user, there will be a different view provided to him as illustrated in diagram 1120C—the destination viewpoint will be 1130B whereas the source view point will remain 1130A. Arrow 1130A illustrates the translation movement that applied effectively to the destination user viewpoint.

In FIG. 1G, an initial orientation of destination user and source user is given in an axial diagram 1120A and a respective viewpoint transmitted via source user is given in diagram 1240A. In a case that the destination user chooses to be free to decide on the elevation and role and let the azimuth be decided by the source user, an axial diagram 1220B illustrates the new orientation of source user and axial diagram 1230B illustrates the new orientation of destination user. Since the elevation and roll are per the destination user, the view point of destination user of the new orientation as shown by 1240B shows the azimuth of source user but elevation and roll that remain as per the destination user. Thus, destination view is affected by both users, in combination.

In FIG. 1H, an initial orientation of destination user is given in an axial diagram 1310A and a respective viewpoint transmitted via source user is given in diagram 1340A. In a case that the destination user chooses to lock its view to a predefined elevation and roll (i.e. a specific object in the scene) and let the azimuth be decided by the destination user, an axial diagram 1320B illustrates the new orientation (azimuth only) of destination user and axial diagram 1330B illustrates the new orientation (elevation only) of destination user. Since the elevation and roll are predefined and are not affected by either destination user or source user, the view point of destination user of the new position as shown by 1340B shows the azimuth of source user but predefined elevation and roll that remain unchanged. Thus, destination view is affected only by one axis of the destination user (azimuth) and locked to an external value unaffected by any of the users (being the elevation sector associated with range 1346) as illustrated by translation arrow 1346 shifting viewpoint 1342 to 1344.

The aforementioned embodiments are referred herein as full and partial bore sighting of the destination user to the source user orientation. According to some embodiments of the invention, the cropping of media performed by the data communication unit 114 may be locked to any one or more of parameters including pan, tilt and elevation. In this way, variations in the corresponding parameter by the source user, such as the source user momentarily looking at the ground, do not affect the ROI presented to the destination user 2.

According to some embodiments of the invention, images or audio or both presented to the destination user 2 may be aligned to the line of sight of the source user 1. Thus, a system according to embodiments of the invention may be configured such that as long as the destination user 2 is looking in a predetermined direction, for example straight ahead, he will "see", e.g. have displayed to him via display 211, whatever the source user 1 is looking at. Thus the source user 1 can take the destination user 2 on a "virtual tour" wherever he is. However the destination user 2 can take an active part in the tour. For example as the source user looks straight ahead at the road 90, the destination user can turn his head as if to look behind himself and see an image of the telephone booth 80. This results from the destination user 2 having transmitted to him images cropped according to a region of interest defined by his line of sight. Then, the destination user 2 may say to the source user 1 "Hey there's a really interesting telephone booth behind you!". The source user may then turn to face in the direction indicated by vector $U_3$, and the destination user may then turn back to look straight ahead to have presented to him the same field of view as the source user 1. Audio communication between source user and destination user may use the respective audio arrays 215,115. Thus according to some embodiments of the invention, in the mapping of request to ROI, a deviation in LOS of the destination user 2 from a reference position such as straight ahead may be mapped to a region of interest with a corresponding deviation from the current line of sight of the source user 1.

Some embodiments of the invention may operate in an analogous manner using audio, so that, for example, the destination user can alert the source user to the direction of a particular sound. This may be particularly useful if the source user has impaired hearing.

Architecture

It should be noted that in principle the functions of a data communication unit described herein may be performed at the destination by data communication unit 214. In this context, a request for media, e.g. to view video images, might be received from the IMU 213 and transmission of images might be from data communication unit 214 to display 211. The cropping of media, e.g. images, by source data communication unit 114 or a data communication unit 125 in server 120 may be useful where bandwidth is limited.

According to some embodiments of the invention media, such as a sequence of images or streamed audio or both, presented to the destination user may be augmented with additional images from a source other that source user 1 equipment such as headset 11. Thus a data communication unit 114, 214 or a data communication unit in a remote computing device may comprise one or more processors configured to receive additional images of a source location from one or more sources other than the camera 110 of source user headset 11. This might be useful for example if there is an interruption in communication between source user 1 and destination user 2, or a degradation in quality of images transmitted between the source and destination users, to compensate for an obstacle blocking the view of the source user 1 or any other reason. In other words, a source user (not shown) other than source user 1 becomes an ad hoc source user for same destination user 2 until source user 1 becomes available again.

Additionally or alternatively to displaying images from supplementary source user headset 31, in a system according to some embodiments of the invention additional images used to augment a sequence of images displayed to a destination user may be received from one or more stationary cameras, such as closed circuit television (CCTV) cameras, such as might be used for building surveillance. Additionally or alternatively such additional images may be received from a database of previously stored images of said source location. Thus for example a proprietary database 150 in communication with network 100 may supply images to "fill in" gaps in live coverage from source user 1 and so a data communication unit may request such images from a database 150 or stationary camera.

According to some embodiments of the invention, captured media presented to a destination user 2 may be augmented with synthetic media. In the same manner as images from stationary cameras, synthetic audio or images may be used to replace frames captured at a source. Additionally or alternatively, synthetic audio or images may be merged or combined with captured audio or images. For example, the source user may be at a certain location with poor visibility conditions, e.g. during night time, with low light. Previously generated synthetic graphics of the scenery may be added to captured images to boost the visual acuity for the destination user. This may for example compensate for a poor quality image captured by a 360° sphere camera.

Systems and methods according to embodiments of the invention may be used in an unlimited range of applications in addition to those described with reference to FIGS. 1A to 1E. Another possible application is in the field of video conferencing and is described with reference to FIGS. 2A to 2C. This embodiment is described particularly in connection with the display of images but it will be appreciated that the same directionality is possible according to embodiments of the invention with audio instead of or in addition to video.

Figure 2A:
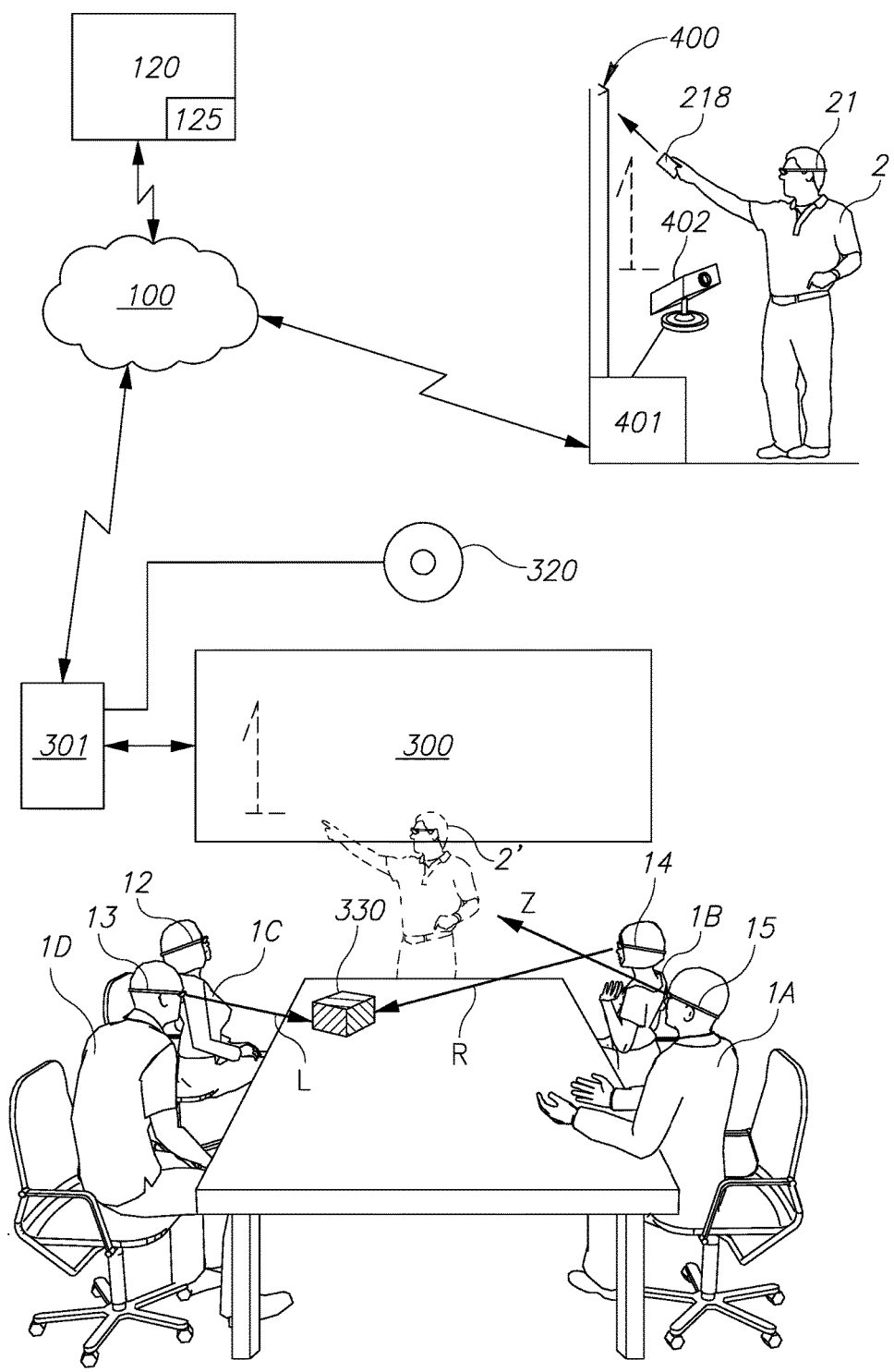
FIG. 2A is a schematic diagram illustrating yet another aspect of a system for sharing video images according to some embodiments of the invention.

FIG. 2A shows a destination user 2 and a group of source users 1a-1d. Again, the terms "source" and "destination" are interchangeable in that any source user 1a-1d could be considered to be a destination user and the destination user 2 could be considered to be a source user 1a-1d. In the scenario shown in FIG. 2 there may be more than one destination user 2. It will be appreciated that some operations in methods according to some embodiments of the invention may be performed by any of the data communication units 114, 214 and 125 depending on whether the relationship between source users and destination users is one to one, many to one, or many to many. It will also be appreciated that in all embodiments of the invention the functions of a data communication unit may be distributed across multiple devices.

Figure 2B:
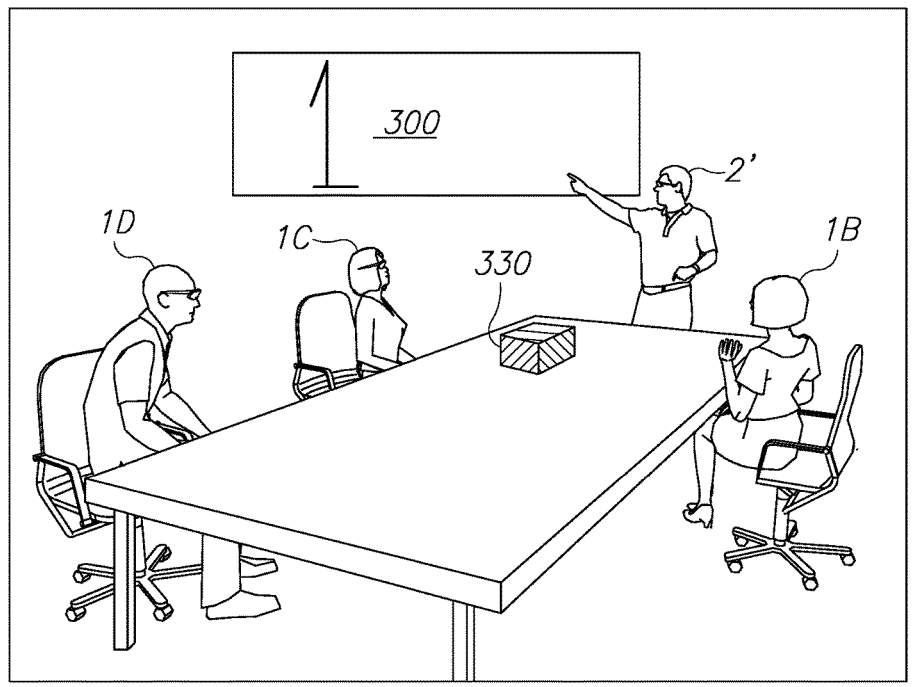
FIGS. 2B and 2C are viewpoint diagrams illustrating field of view of users of a system for sharing video and audio according to some embodiments of the invention.
Figure 2C:
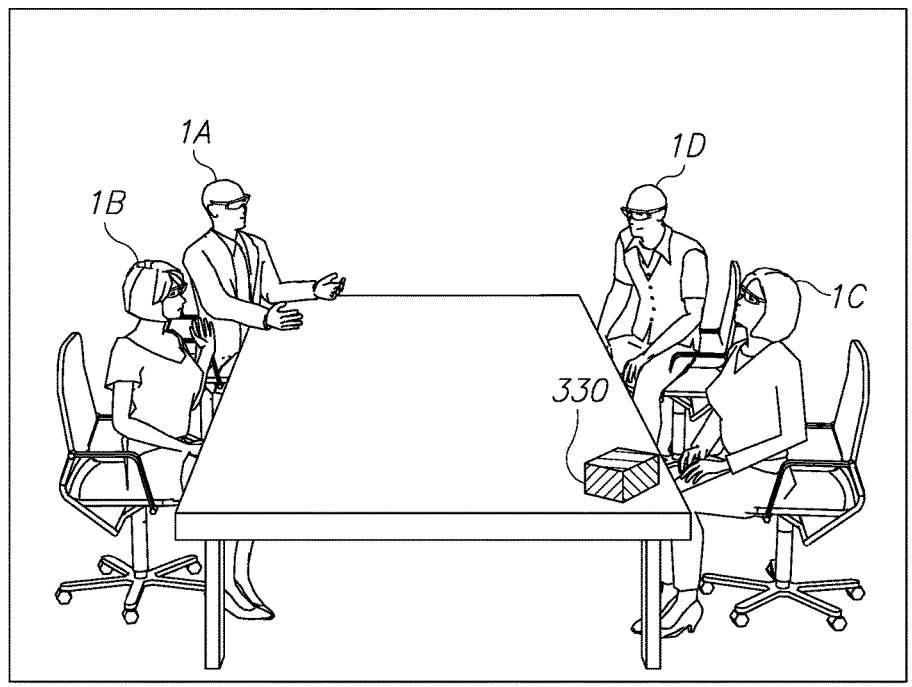

The description with reference to FIGS. 1A-1E is equally applicable to FIGS. 2A-2C except that the objects in the field of view of the cameras, or objects displayed to users, are different. Also, aspects of the systems and methods described with reference to FIGS. 2A-2C are applicable to the methods and systems described with reference to FIGS. 1A-1E.

In the scene shown in FIG. 2A, the source users 1 and destination user 2 all wear headsets 11, 21. Four source users 1a-1d are shown seated around a table viewing a screen 300. Destination user 2 may be at a remote location or may be unable to view screen 300 or source users 1a-1d for any reason. Destination user 2 is shown viewing a remote screen 400 which may show the same information as screen 300. Each of screens 300 and 400 may be peripheral devices of respective computing devices 301 and 401. Any of data communication units 114, 214, server data communication unit 125 and computing devices 301, 401 may communicate with each other via network 100.

In the scenario shown in FIG. 2A, the destination user 2 may act as "presenter" to the source users 1 and for this purpose a virtual graphic image 2' of destination user 2 may be displayed to any of source users 1A-1A. FIG. 2A shows a virtual graphic image 2' being displayed to the source user 1a that it is visible when he looks in the direction of arrow z. Thus the real world view of this source user 1a is augmented with the virtual graphic image 2'. A similar virtual graphic image may be displayed to any of source users 1a-1d shown in FIG. 2A. Each of the source users may have displayed to them a version of the virtual graphic image 2' according to their viewing direction.

Additionally, destination user 2 may affect the real world when, for example, the real word has a screen 300 that is reactive in the real world to acts carried out by destination user. Destination user 2 can for example draw the figure "1" using a device with IMU such as 218 and these movements will be translated not only to his respective virtual graphic image 2' (as seen by source users 1A to 1D who are on-site) but also a real figure "1" will be shown on screen 300 (or possibly only seen via HMDs of on-site viewers).

According to some embodiments of the invention including those described with reference to FIGS. 1A-1E as well as those described with reference to FIGS. 2A-2C, a data communication unit 114, 214 or 125 may receive signals from one or more sensors sensing movement of one or more limbs of a destination user and may animate a virtual graphic image to imitate such movement. FIG. 2A shows destination user 2 having a pointing device 218 which may for example comprise a device having an IMU held in one hand to sense movement of the user's arm. The pointing device 218 may comprise for example a mobile phone. Pointing device 218 may communicate with data communication unit 214 in headset 21 via any suitable communication link including but not limited to Bluetooth. Alternatively pointing device 218 may bypass data communication unit 214 and communicate directly with data communication unit 114 or 125.

According to some embodiments of the invention, a user interface presented to destination users may be controlled in response to movements of a limb of a destination user, for example by communication between computing devices 301, 401. This user interface may be presented on displays 300, 400 or may be presented on individual user displays 211, 111.

Images may be presented to destination user 2 in different modes. Two possible modes include "presentation" mode and "audience" mode. For example suppose that source user 1a is the presenter indicating items on screen 300 to source users 1A-1D. In this mode, destination user 2 may have displayed to him an image similar to that shown in FIG. 2B, in which the destination user sees the screen and the other participants from the location where source user 1A was seated. For this purpose, a data communication unit 125 or 214 may receive in real time sequences of images from several cameras 110, receive requests to view images captured at the source location, e.g. the conference room, according to the destination user's line of sight, for example depending on whether he wishes to view the screen or the other participants. A data communication unit may map requests to ROIs and process images from more than one camera 110 to display to the destination user 2 a cropped sequence of images according to the ROIs. For this purpose a data communication unit may process images captured by camera 110 of source users 1A-1D to compensate for their different LOS from the vacated position at the table. A wide FOV, e.g. 360°, camera 320 (or a simple webcam where applicable) may be positioned to capture the field of view in front of the screen 300. This may be used to capture the "presenter" field of view of virtual graphic image 2' to be rendered to the destination user 2.

Instead of the destination user 2 "seeing" the room from the perspective of an empty seat, the destination user may see the room from the view point of one of source users 1B, 1C, 1D in a similar manner to the system described with reference to FIGS. 1A-1E.

When the destination user 2 is part of the audience, a virtual graphic image 2' of the destination user 2 may be displayed to the source users 1A-1D via their respective headsets 11, for example in the vacated location of source user 1A.

In presentation mode, destination user 2, for example represented to the source users 1A-1D by virtual graphic image 2', may have displayed to him an image of the participants. In a similar manner to audience mode, a data communication unit in the headset of the destination user 2 may transmit a request to view images captured in the room. The request may include a LOS. The request, or LOS, may be mapped to an ROI based on the LOS. Video images received from cameras on source user 1a-1d may then be processed to display to the destination user a cropped sequence of images of the room according to his LOS.

Avatar Positioning

The respective user to whom the virtual graphic image is displayed may determine where the virtual graphic image is to be positioned. Thus in some embodiments of the invention, an instruction is received, for example in a data communication unit, to display a virtual graphic image in a predetermined position and/or orientation relative to the respective display and the virtual graphic image may be displayed according to the instruction. Thus, for example, source user 1A in FIG. 2A may find out that other source user 1B sits along the line of sight between him and where avatar image of destination user (the presenter) 2' is supposed to be. Therefore, in order to avoid an obstruction, virtual graphic image 2' may be shifted to the left so he is not obstructed. Alternatively, avatar 2' can be modified for each of the viewers to reflect the partial obstruction carried out by objects such as other source users in the scene. Further alternatively, an optimization algorithm may be applied before starting the session for finding the best location for virtual graphic image 2' so as to minimize any obstructions.

Sharing a 3D Model of an Object

In accordance with some embodiments, the source users can share not only the scene but also a 3D model of an object within the scene. For example, a real-world object such as object 330 on the table can be captured in real time by either camera 320 or by the image capturing devices on the headsets 12-15 of source users 1A to 1D and these captured images may be used by data processing system on server 120 to generate a 3D model which can be shared and viewed by destination user 2. Additionally, destination user may interact with the 3D model presented to him by rotating it as if he was actually holding or interacting with it. By this, another level of sharing the immediate scene of source users can be provided to destination user 2, where the image and the 3D model may be constantly updated if needed be by fresh images from image capturing devices on the headsets 12-15.

In the foregoing, specific possible use cases for embodiments of the invention are described. It will be appreciated that many more are possible. It should also be noted that not all embodiments of the invention require media to be played to a destination user in real time. Embodiments of the invention may be used in tourism. For example, destination user 2 may take a virtual tour of any location from his chair. The experience may replace actual travel, e.g. for the disabled. The destination user may take a tour in real time and the source user may be a guide. A virtual tour of the kind described herein may be used for the promotion of locations for tourism. This and other such use cases do not require the cropped images to be transmitted in real time. According to some embodiments of the invention, the captured media may be stored and cropped in real time or "on the fly" so that, for example, the destination user can choose directions, for example through LOS, or direct the speed of travel.

Some embodiments of the invention may be used to provide a virtual shopping experience. A destination user could be conducted around a store by a source user or could conduct his own tour using stored media. At the same time the destination user could make online purchases based on products seen on display.

Another possible use case for embodiments of the invention is in sport, for example a source user could be a sports person and the destination users could be the spectators. This might be useful in training sports people as well as for entertainment.

Another possible use case for embodiments of the invention is in the field of performance entertainment, where a destination user may have an experience from the performer's viewpoint.

Wearable Sensors

Figure 2D:
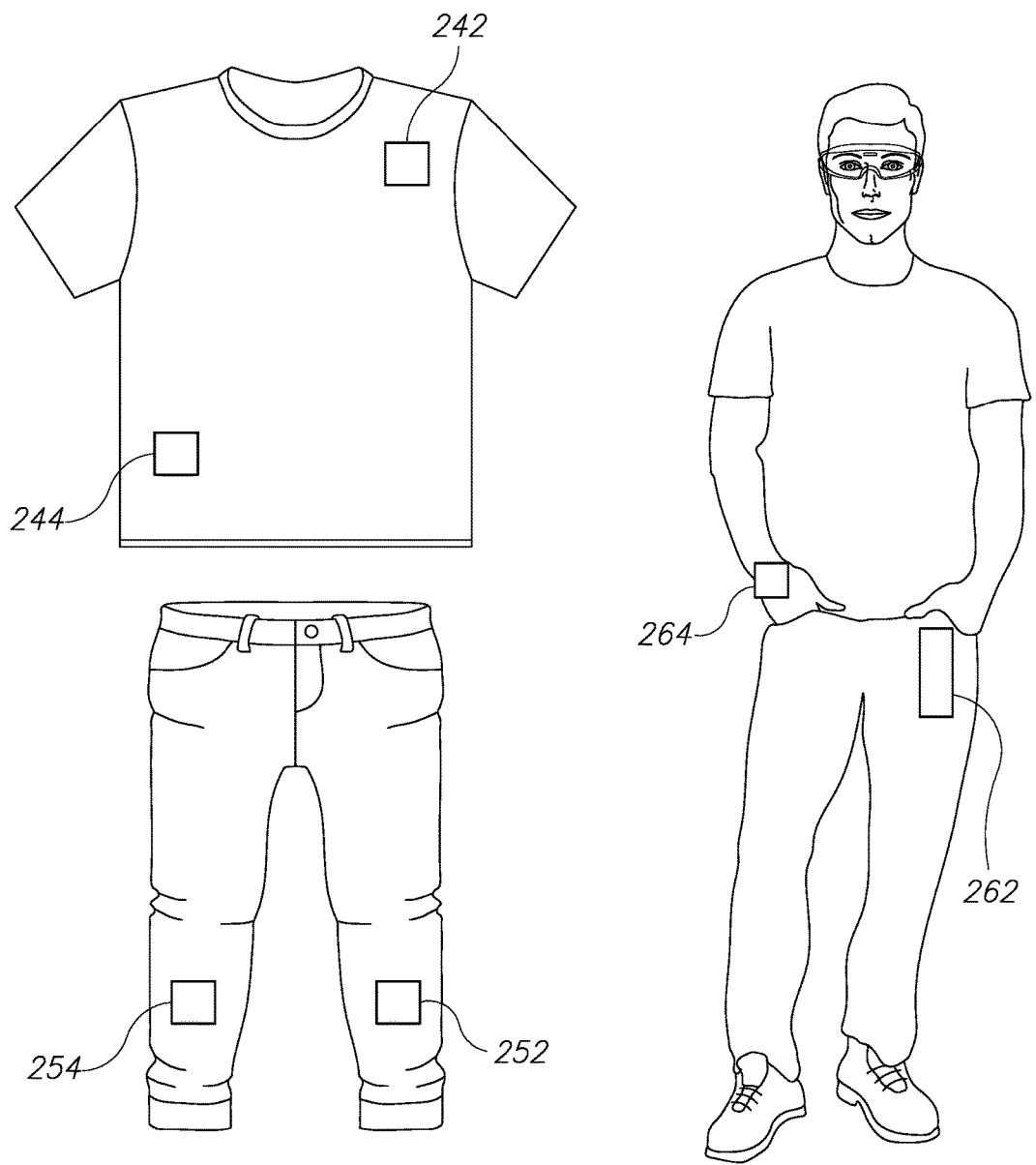
FIG. 2D is a schematic diagram illustrating yet another aspect of a system for sharing sensed telemetric according to some embodiments of the invention.

FIG. 2D is a diagram illustrating a user (either a source or a destination user) having various wearable sensors attached to a plurality of bodily locations. In some embodiments, the sensors are integral of existing devices such as a smartphone 262 or a watch 264. In other embodiments, the sensors are dedicate sensors 242, 244, 252, 254 attached to the shirt and the pants, respectively. Embodiments of the invention are not limited to the sharing of "directional" media such as video and audio. As noted herein, user equipment may be carried on parts of the body other than the head. Such equipment may include any number of sensors and other devices to capture the movement data or environmental data of the source user 1. This may be used to animate any of the virtual graphic images described herein. This data may be transmitted to a destination user in real time or stored for later transmission. Therefore in any of the use cases for embodiments of the invention described herein it is possible to share not only captured video or audio but also other data relating to the movement or environment of the source user. Thus for example the destination user may be able to share not only images and audio captured at the source but also such other data.

According to some embodiments of the present invention, wearable sensors may include sensors beyond image and audio. Such sensors may include sensors configured to capture: environmental telemetries (e.g. humidity, temperature, gases, smell); spectral radiation (e.g. Infrared, Ultraviolet); radio radiation—nearby radio frequency (RF) (e.g. Bluetooth, Wi-Fi cellular); source physiology telemetries (e.g. body temperature, skin saltiness, heart-rate, blood oxygen, blood pressure, ACG).

In embodiments where an avatar is displayed to the destination user, the avatar may be animated according to captured movement data, for example to show complete body activity. Thus for example the destination user may see, from the animation of the avatar, which direction he was looking in at any time.

According to some embodiments of the invention, for example in order to compensate for latency between requesting and receiving a displayed image, the orientation, or LOS, of the destination user at the time of receipt of a sequence of video images may be predicted, and this may be used in the mapping of a request to ROI. In other words ROI may be based on predicted LOS at the time of receipt of an image rather than ROI at the time of request. This prediction may for example be based on measurement of speed of movement using IMU measurements. If a user is moving his whole body as well as his head, a request may also include a prediction of position, based for example on GPS measurements. The cropping of a sequence of images may then be based on predicted orientation and/or position rather than current orientation and/or position.

Figure 4:
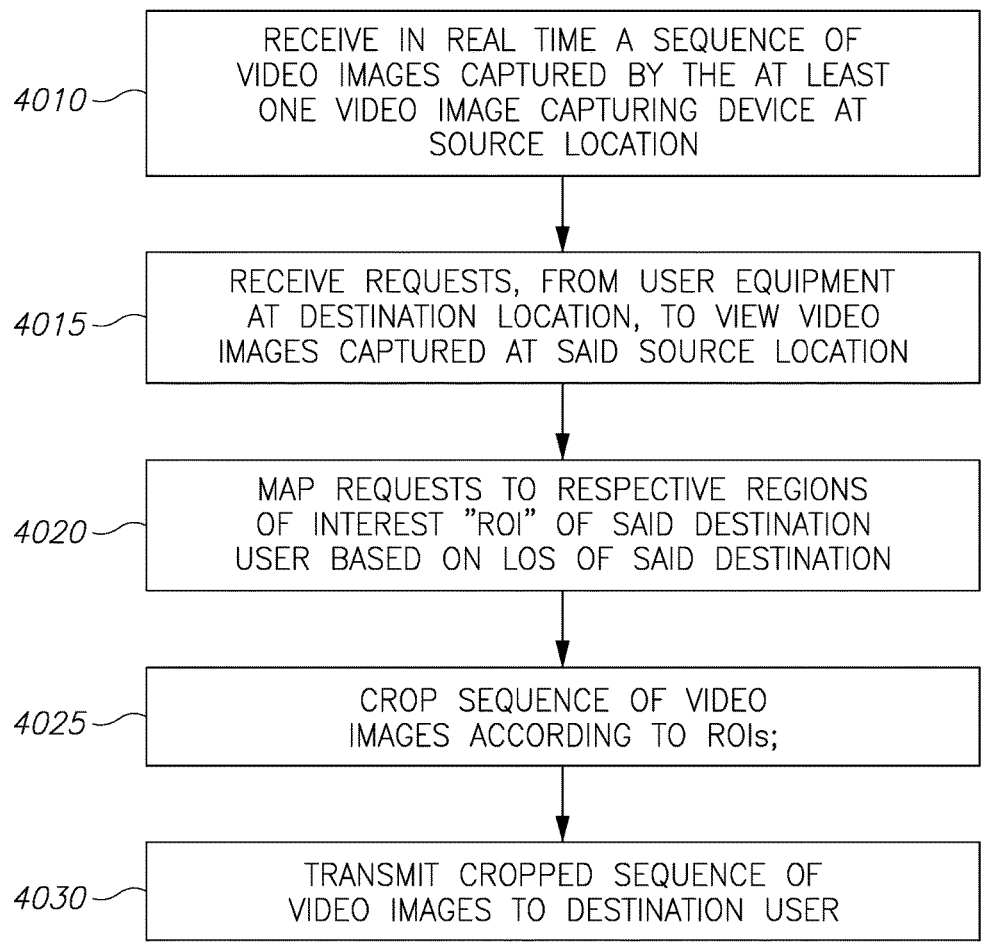
FIG. 4 is a flow chart showing operations in a method according to some embodiments of the present invention.

FIG. 4 is a flow chart of a method of sharing media comprising operations common to some embodiments of the invention described with reference to FIGS. 1A-1E and 2A-2C. The method may be implemented in one or more computing devices performing the function of a data communication unit as described herein. FIG. 4 is described with reference to images but it will be appreciated from the foregoing that an analogous method is applicable to audio or a combination of audio and video.

The method of FIG. 4 comprises, at operation 4010, receiving in real time a sequence of video images captured by at least one video image capturing device at a source location. In some embodiments, several such sequences may be received from different cameras at the source location, such as cameras carried by source user 1 and supplemental source user 2 or cameras carried by source users 1A-1D.

At operation 4015 a request may be received, for example from destination user equipment, such as destination user headset 21, to view video images captured at said source location. According to some embodiments of the invention, the response to such a request is independent of the location of the destination user. This operation may occur at a frame rate corresponding to a video display frame rate or it could occur at intervals, e.g. every n frames.

The term "location" used herein, for example in relation to the source user 1 or the destination user 2 may be broadly interpreted to refer to a room or predefined area, or it may be as precisely defined as position determining systems permit.

At operation 4020, requests may be mapped to ROIs, for example based on LOS of a destination user 2.

At operation 4025, a sequence of images may be cropped according to the ROIs. A sequence of frames may be cropped according to the same ROI if the request rate is less than the frame rate.

At operation 4030 a cropped sequence of video images may be transmitted to the destination user 2.

In situations where both the source and destination are mobile, for example both are comprised in equipment worn by individuals, e.g. users, instability can arise in a sequence of images presented to a user. It is therefore desirable to compensate for such instability. Some possible methods of compensation according to some embodiments of the invention will now be described.

A method according to some embodiments of the invention will now be described with reference to FIGS. 5 and 6, and in more detail with reference to FIGS. 7 and 8.

Image and Audio Stabilization

In any of the methods and systems described herein, there may be latency in communication channels via which requests and images and audio are transmitted. Thus movements of the source or destination or both, e.g. one or both of source user 1 and destination user 2, may degrade the user experience. According to some embodiments of the invention, in any of the methods and systems described herein, any of such movements may be compensated for, for example to stabilize images and audio presented at the destination. This may be done in asynchronous processes carried out at a server and at a client respectively, e.g. in data communication unit 114 or 125, and in data communication unit 214. Thus for example a source data communication unit may run a client application and a server or source data communication unit may run a server application. For example, movements of a video image capturing device during the capturing of an image may result in artefacts that may be compensated for at the destination. Movement of the destination user between requesting an image and the image being displayed may also be compensated for. Such compensation may include predicting the position and/or orientation of the destination user 2 at the time of receipt of images. The cropping of images may allow a margin, for example based on the prediction, to accommodate possible differences between predicted and actual position and/or orientation at the destination. Then, at the destination, a received image may be further cropped, for example within the margin, according to the actual position and/or orientation at the time of receipt of an image for display.

In any of the methods and systems described herein it is also possible to compensate to some extent for instances when the difference between predicted and actual position and/or orientation at the time of receipt of an image is beyond the bounds of the margin. This compensation may comprise for example displaying to the destination user a previously stored image of the ROI. For this purpose, according to some embodiments of the invention, an image with a wide field of view from one or more sources may be stored at the destination, for example to be used for "filling in" in instances where the destination has moved too far for a currently received image to be suitable for display. This stored image may be updated, for example using some or all of the cropped images received in response to requests described herein, for example as generated in operation 4025.

Figure 5:
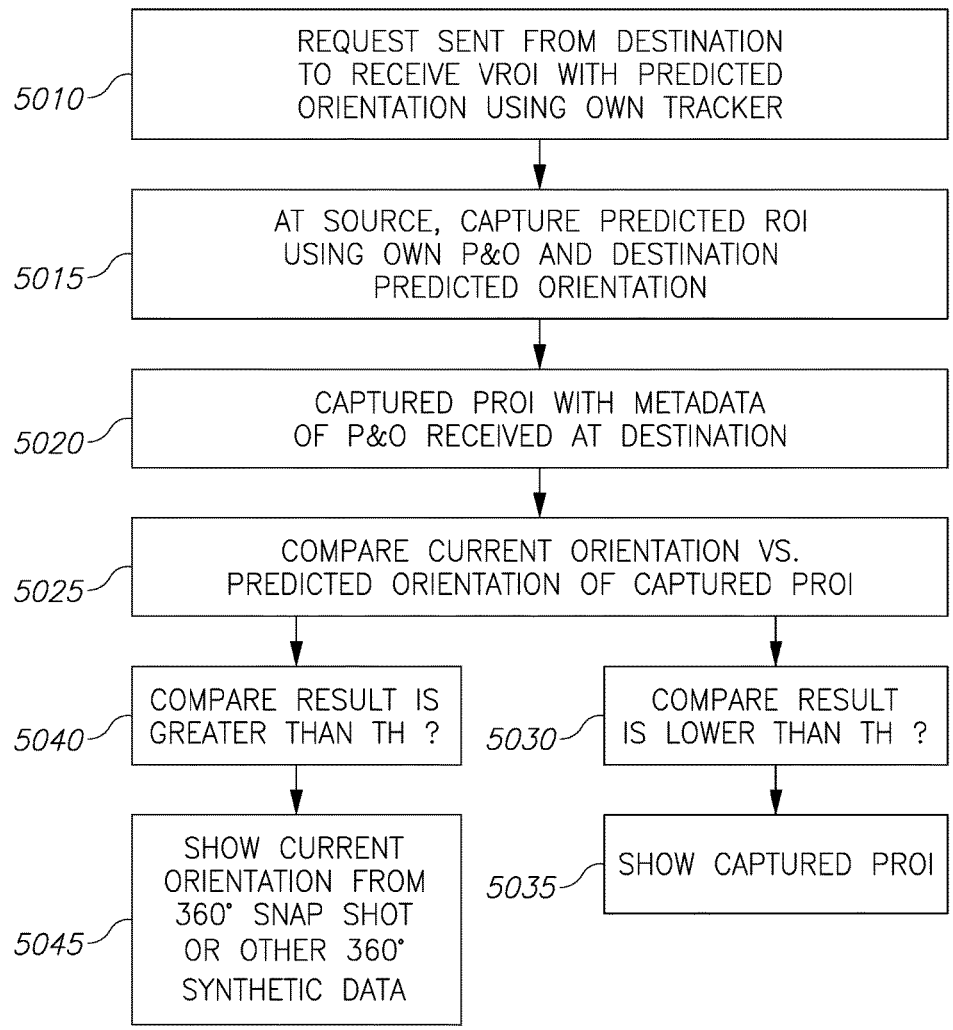
FIG. 5 is a flow chart showing a series of operations by which movements of a destination user may be compensated for to improve the quality of images displayed to destination user.

FIG. 5 is a flow chart showing a series of operations by which movements of the destination user 2 may be compensated for to improve the quality of images displayed to destination user 2.

The flow of FIG. 5 commences with operation 5010 in which a request is sent, e.g. transmitted, to receive a viewable region of interest (VROI). This request may be transmitted for example by data communication unit 214 to data communication unit 114 or 125. The request may include a predicted orientation. The prediction may be performed using a tracker forming part of the destination user's equipment, for example IMU 213. The request may additionally include a predicted position of the destination user 2, determined for example by GPS 212. The prediction may be performed at the destination, for example in data communication unit 214, at a server, for example in data communication unit 125, or at the source for example in data communication unit 114. In each case this may be based on signals from one or more trackers at the source. The request may simply include orientation or LOS to be mapped to a VROI on receipt.

At operation 5015, at the source, an image of a predicted region of interest (PROI) is captured based on the destination predicted orientation received in operation 5010 and the current position and/or orientation "P&O" of the source. The P&O of the source may be determined using IMU 113 and GPS 112 for example. The P&O may be used for example in alignment of information overlaid on cropped imagery from a source, for example in augmenting reality, e.g. with a virtual graphic image. If the source is moving and if it is desired for the position and orientation of source and user to be aligned as far as possible, operation 5015 may be based on predicted position and orientation of the source, e.g. source headset 11. The captured image may be transmitted by data communication unit 114 for display to destination user 2. The captured image may be transmitted together with related metadata including the predicted position or orientation or both which were included in the request transmitted at operation 5010. It should be noted here that embodiments of the invention may be implemented in situations where the source user 1 or destination user 2 or both are moving in vehicles or use locomotion assistance devices and may therefore move faster or differently from what the human body alone is capable of. In such embodiments data from sensors in a locomotion assistance device, such as vehicle movement sensors, may be used in the prediction of position.

At operation 5020, the image captured at operation 5015 is received at the destination, for example by data communication unit 214.

At operation 5025, the current and predicted position and orientation or both of the destination user 2, for example as determined by one or both of IMU 213 and GPS 112, are compared. If the difference between the current and predicted measurements is greater than a predetermined threshold TH, the received image may be modified, e.g. replaced to compensate for this difference.

As shown in operations 5030 and 5035, if the compare result is determined to be lower than the predetermined threshold TH in operation 5030, the captured received image may be displayed to destination user 2 in operation 5035. According to some embodiments of the invention, the captured received image may be modified to compensate for movements that may have occurred in the capturing of the image. Such modification may include warp transformation, decentering or rotation as is known in the art.

If the compare result is determined to be larger than a predetermined threshold TH at operation 5040, some compensation may be used. In the embodiment described in FIG. 5, instead of displaying the captured image a replacement may be displayed to destination user 2, such as a previously stored video image corresponding to the actual orientation of destination user 2, and possibly the actual position of destination user 2. Alternatively some other synthetic data relating to the ROI may be displayed such as simulated graphics of scenery, or real images from additional sources such as Google Earth™, street view imagery and 3D animated graphics.

Figure 6:
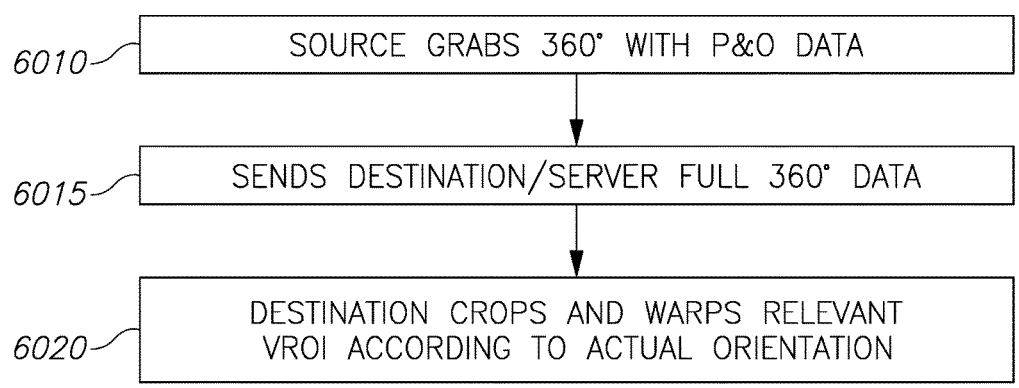
FIG. 6 is a flowchart of a method according to an alternative embodiment of the invention which might be implemented in a situation in which cropping at the destination is possible; according to some embodiments of the invention.

FIG. 6 is a flowchart of a method according to an alternative embodiment of the invention which might be implemented in a situation in which cropping at the destination is possible, for example where bandwidth is large and the entirely of wide field of view images may be transmitted to the destination, e.g. data communication unit 214. In this method, wide field of view, e.g. 360°, images may be captured, or grabbed, at the source in operation 6010 together with corresponding position and/or orientation data. The complete images may be transmitted to a server or destination data communication unit 125 or 214 as indicated by operation 6015. Received images may be cropped at the data communication unit 125 or 214 according to the requested VROI and modified as necessary, for example by warp transformation, described further with reference to FIGS. 7 and 8.

Figure 7:
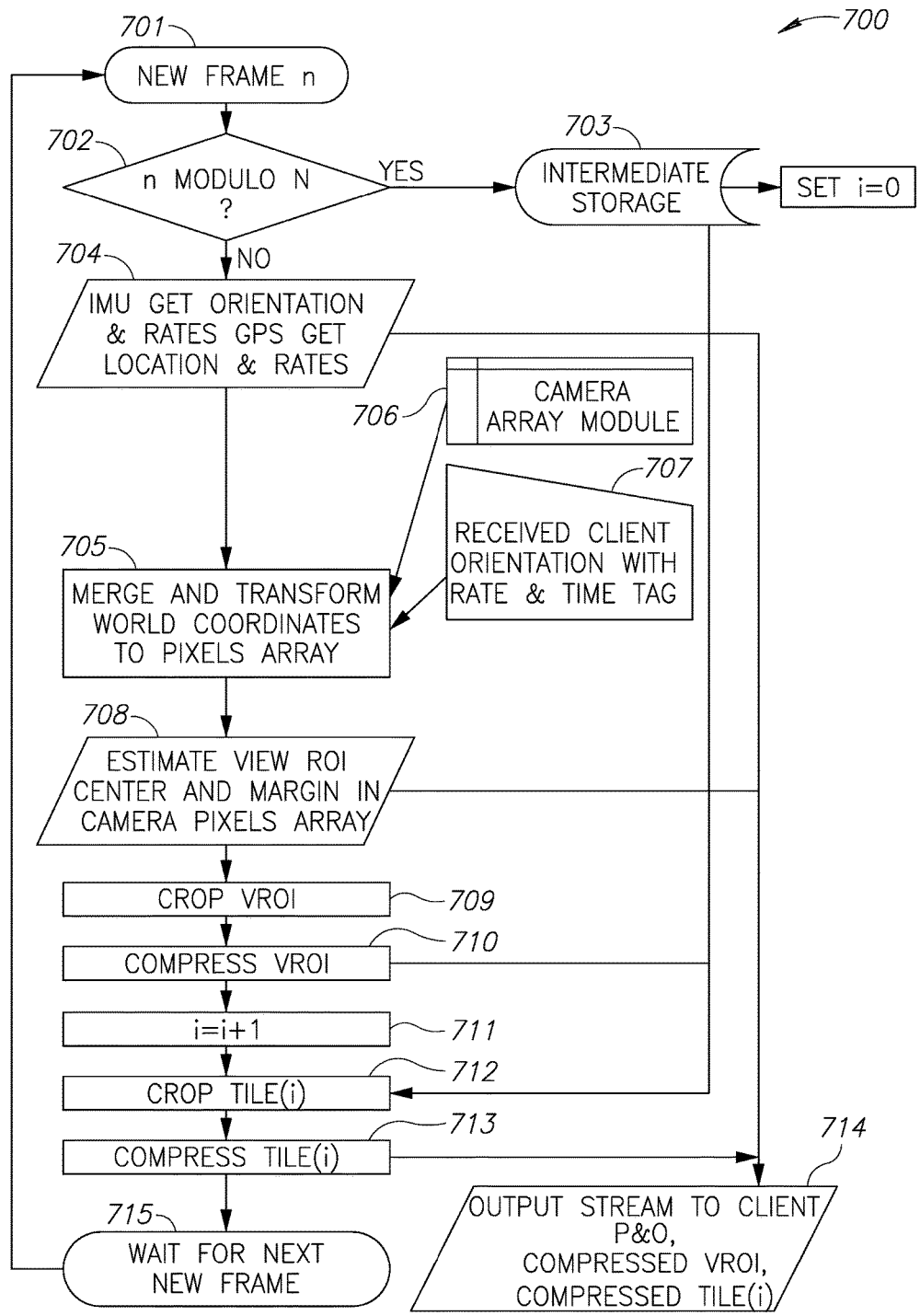
FIG. 7 is a schematic diagram of a server system according to some embodiments of the invention.
Figure 8A:
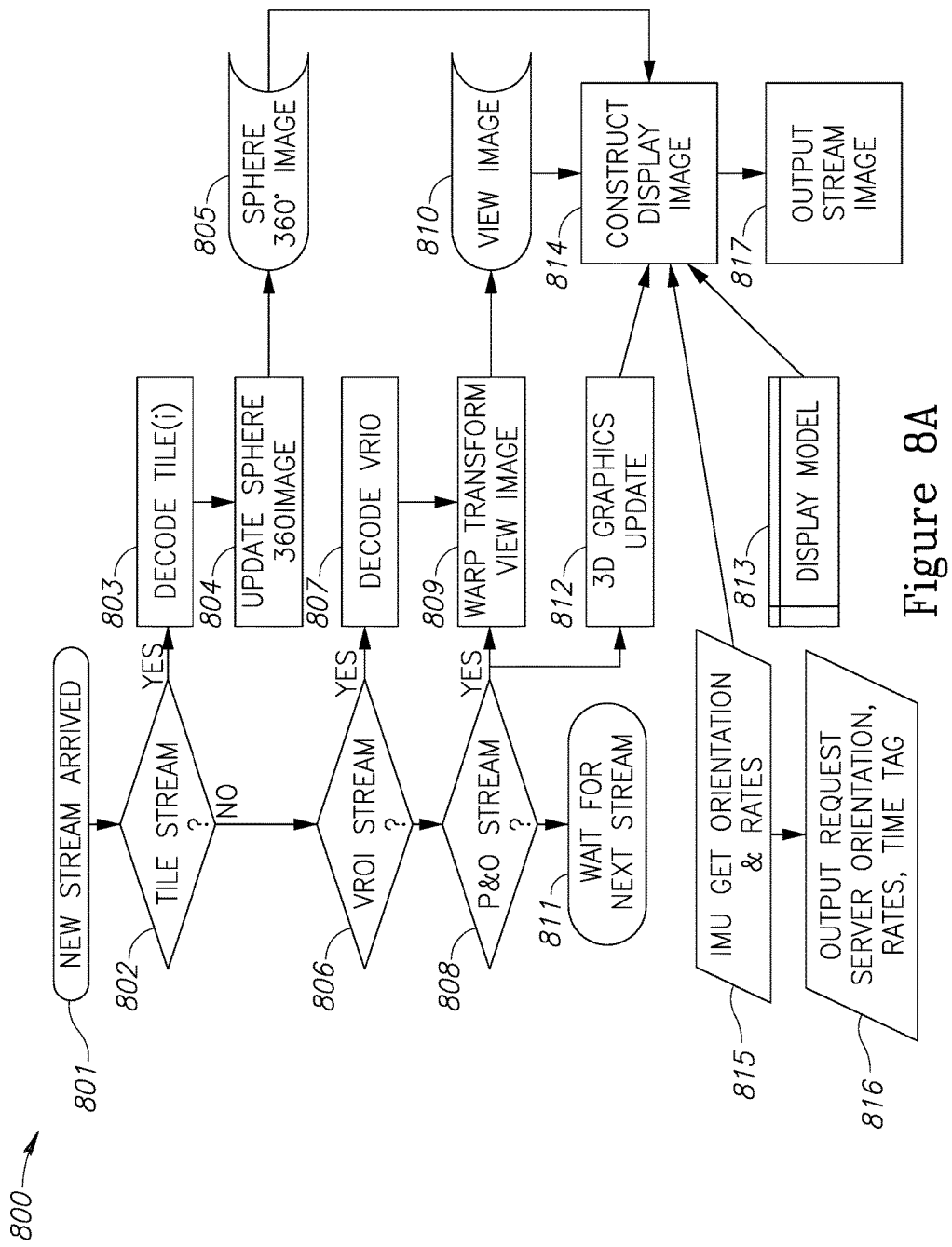
FIG. 8A is a schematic diagram of a client system according to some embodiments of the invention.

FIGS. 7 and 8 are each combined flow charts and block diagrams illustrating methods and systems according to some embodiments of the invention. The embodiments described with reference to FIGS. 7 and 8 may be regarded as comprising two systems. One system may operate as a server 700 or source for live wide angle, e.g. 360° sphere, video, which may be captured for example by a single source such as camera 110, or multiple sources, for example a combination of fixed and stationary cameras. Either of data communication units 114 and 125 may operate as a server system 700 as shown in FIG. 7. The second system 800 may act as a client displaying captured and cropped video received from a source server. Data communication unit 214 may operate as a client as shown in FIG. 8A.

Figure 10:
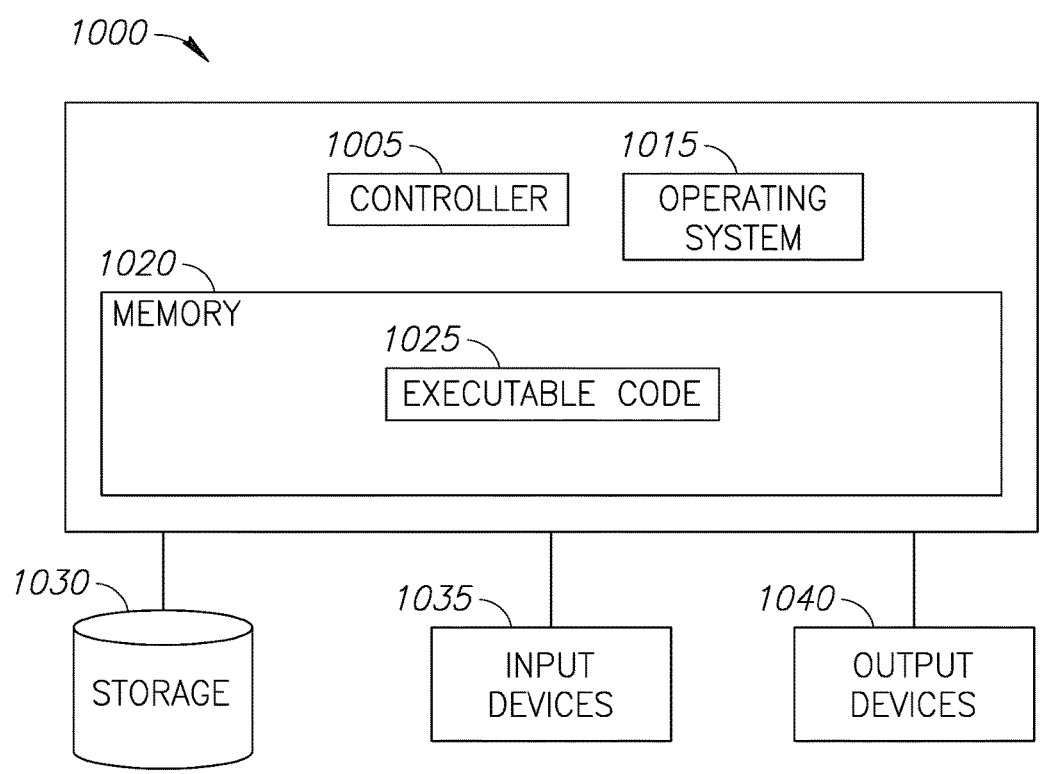
FIG. 10 is a schematic diagram of a computing system which may be used to implement some embodiments of the invention.

Both client and server according to embodiments of the invention may be implemented in computing systems as known in the art and described herein with reference to FIG. 10.

The server system 700 may continuously capture frames as indicated at operation 701 with a wide field of view such as of a 360° sphere video (e.g. in a rate of 60 frames per second), along with a related high rate orientation data 704 (e.g. at a rate of 200 Hz), and geo location data 704 (eg. at a rate of 1 Hz). In other words, according to some embodiments of the invention, the whole field of view of the at least one video image capturing device may be captured at intervals at a source location, e.g. periodically. Position data may be captured at a lower rate. Orientation data may be captured at a higher rate than the whole field of view, for example by a factor of three or more. Each captured item, e.g. frame, orientation, position, may have an associated time tag.

Periodically (e.g. every 10 seconds or every N frames where N=600 at 60 Hz frame rate) a whole sphere (360 degrees) image frame, for example as captured at operation 701 may be stored, after an N modulo operation 702 has been applied guaranteeing a fresh sphere image has been captured, for example in an intermediate storage 703.

Upon receiving a client request 707 for a viewable region of interest (VROI), for example as in operation 4010, the server system 700 may perform a vectorial merge (merging an transforming world coordinated into pixel arrays) 705 between a requested direction or LOS received from a client such as data communication unit 214 and the 360° sphere camera direction. It should be noted here that the request or LOS received from a client may have an associated time tag. For example, at operation 705 the server may transform the destination LOS received in the request at 707 and/or its own LOS which may have been determined at operation 704 from a world coordinates system to the coordinates system of the camera, e.g. camera 110. This transformation may be performed using a model 706 of the camera array of pixels which may differ from one camera or other video image capturing device to another. The transformation of coordinates from world to pixels may for example combine the destination (or source) line of sight with the source 360 camera direction and the camera 360 model. This combination may be made using a vectorial calculation. The transformation may be a transformation from polar coordinates to Cartesian coordinates, e.g. pixel x, y.

Figure 9:
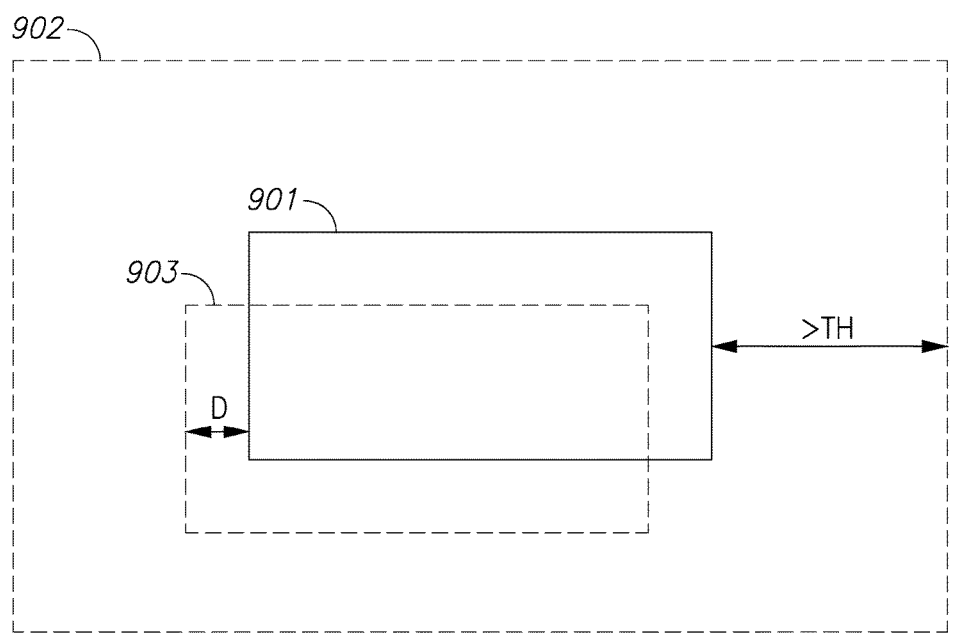
FIG. 9 is a diagram illustrating the use of margins to accommodate differences between predicted and actual location of a destination user on receiving images for display, according to some embodiments of the invention.

The request 707 may include the predicted orientation and/or position of the destination user 2 at the time of receipt of the requested VROI as indicated at operation 5010 in FIG. 5. Alternatively, the prediction of orientation and position may be performed in server system 700 as indicated by operation 708. Alternatively the request 707 may include LOS or orientation which is then mapped to an ROI, for example PROI, in operation 708. The server system 700 may calculate at operation 708 the center and margins of the requested VROI, for example based on the PROI. The determination of center and margins or the prediction of ROI may be based for example on any one or more of direction of movement of the destination user 2, for example as determined from GPS 212 measurements, the client direction rate and the last time tag, any of which may be included with request 707. Operation 708 may be implemented using a Kalman filter estimator in a manner known in the art in order to predict the next location of the VROI. Operation 708 may help to minimize round trip latency issues that may arise out from communication channel lags. The margins are indicated in FIG. 9 and correspond to the threshold TH mentioned in connection with FIG. 5 and described further with reference to FIG. 8A.

It will be appreciated that a client system 800 to be described with reference to FIG. 8A, may make use of an orientation sensing device such as IMU 213 in order to define the direction of a requested VROI in a similar manner to operation 4015. Further, as described with reference to FIGS. 1A-1E and 2A-2C, the orientation device such as IMU 213 may be attached to a head of a destination user 2, for example in headset 21. One skilled in the art may appreciate that head orientation behavior may be profiled for a typical model (e.g. typical head movement patterns, typical head movement rates, head movement frequencies etc.), which may be used in the Kalman filter estimator model in operation 708. The server system 700 may then perform a cropping operation 709 to crop a region of interest out of the incoming frame, according to the VROI. The VROI may then be compressed at operation 710 and added to an output stream 714.

In parallel, the server system 700 may transfer to the client system 800 a whole field of view image, for example a full resolution 360° sphere image stored on intermediate storage 703. It may be appreciated that sending high resolution wide 360 images requires large bandwidth for transferring the data over the communication channel According to some embodiments, the whole field of view, e.g. wide 360 sphere, image is sampled into tiles at operation 712, where each one of those is being transferred one after the other using counter 711. Each tile may be compressed at operation 713, and then output to stream as indicated at 714, for example, to be transferred to a client system through a communication channel, for example via network 100. The flow then continues to operation 715 to wait for a next frame.

Thus according to some embodiments of the invention, in addition to transmitting cropped media in response to a specific request, a data communication unit or server may transmit images of the whole field of view of one or more image capturing devices at a source at intervals, for example periodically, less frequently than the transmission of cropped images. A typical transmission rate for cropped images might be 60 frames per second and a suitable transmission rate for whole field of view images might be once every 10 seconds the benefit of this is apparent from the description of FIG. 8A.

The server system 700 may add to the output stream 713 the position and/or orientation of system 700 at the time the 360° sphere frame was captured, which the output VROI stream is related to, for example as determined by IMU 113 and/or GPS 112 of a source user 1.

The client system 800 may consist of a display such as display 211, an orientation sensing device such as IMU 213 and a data communication unit 214 to receive and transmit data. The client system 800 may receive a stream of data 801 from a server 800, and output a stream of images 817 to display 211 to be viewed by e.g. destination user 2.

One possible manner of operation of a client system 800 is as follows: A request 816 may be transmitted to server system 700 to view images streamed from a source location. The request 816 may be received at server system 700 as in operation 4015 and may include any one or more of measured parameters relating to the destination user 2 including orientation, rates of movement and a time tag. Alternatively as indicated in operation 5010 the server 800 may use this information to itself determine a predicted orientation of destination user 2 at the time of receipt of requested images.

Once a new stream data 801 arrives, for example in response to requests 816, the client system 800 may perform parse 802 and decode 803 operations to extract a 360° sphere tile (i), for example cropped, or generated according to a method as described with reference to FIG. 7. The client system 800 may then perform update 804 to update a storage of 360° sphere image 805. The client system 800 may then perform parse 806 and decode 807 operations to extract the VROI. The client system 800 may then perform parse operation 808 to extract position and orientation data of the server source system 700, and the related current VROI.

The client system 800 may then perform a warping transformation 809 over the VROI, for example based on the high rate position and orientation data 808, which was captured by the server source system 700 during the capturing process of the video frame which the VROI is related to. It may be appreciated by a person skilled in the art, that a 360° sphere camera image may be constructed by a rolling shutter type image sensor, of which one of the artifacts is the presence of shearing and bending effects in the captured image due to movements during the capturing process. In order to overcome and correct that, server system 700 may make use of an orientation sensing device such as IMU 113 which may be mechanically and rigidly attached to the camera such as camera 110, for example due to being part of the same headset 11. During an image capturing process, this sensing device may measure and capture the camera motion profile at high rate. It may be appreciated that this process may be performed synchronously with the camera operation.

Once reconstruction of an image is performed, for example to be displayed to destination user 2, a warping or other transformation may be conducted, for example making use of the capture motion telemetry by the server system 700, to correct the in-frame distortion artifacts. Once the transformation 809 process is complete, a VROI buffer 810 may be updated. The content of VROI buffer 810 may be used to construct a display image at operation 814 which may then be output as part of an image stream or sequence of video images at operation 817.

Figure 8B:
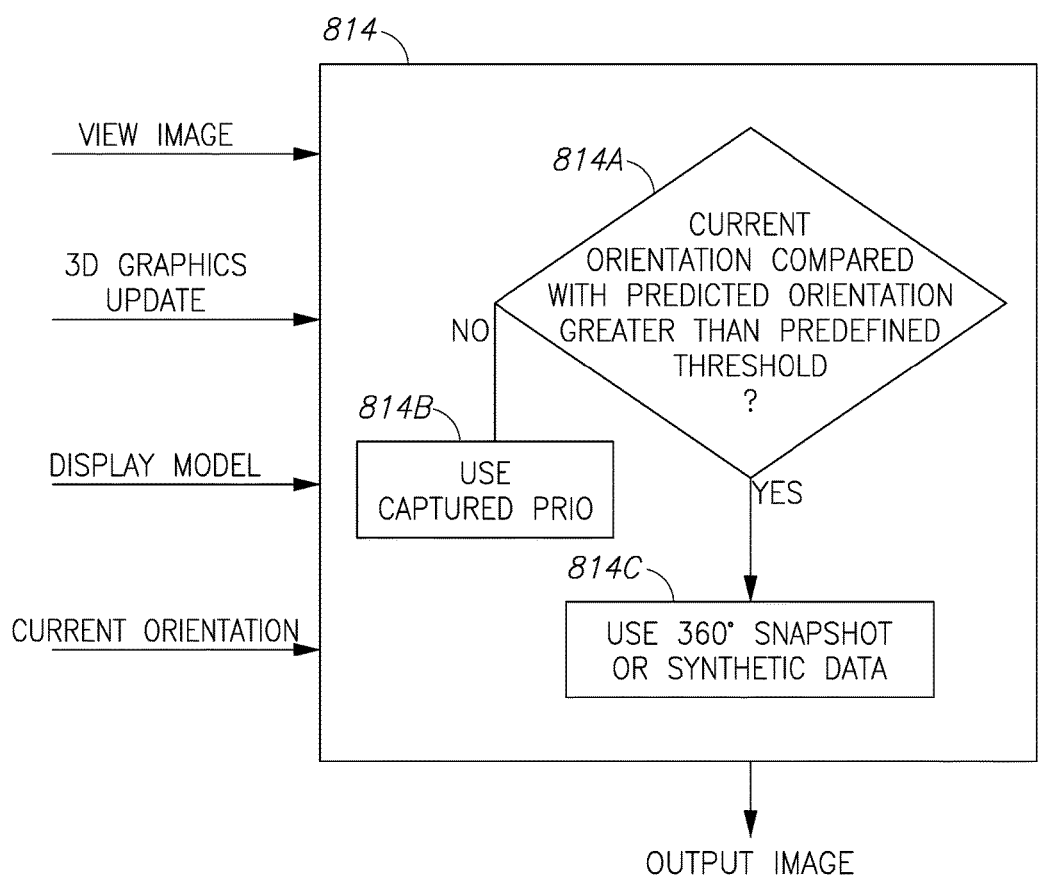
FIG. 8B is a schematic flowchart of an aspect according to some embodiments of the invention.

FIG. 8B shows in further detail block 814 which receives 3D graphics update, current orientation, a display model and the view image and makes a decision of whether to use the captured PROI as in step 814B or user the 360° snapshot or synthetic data as in step 814C based on the calculated deviation between calculated and predicted orientation as per step 814A. As explained above, the construction of a display image at operation 814 may comprise further "cropping" the received VROI to remove some of the margin applied in cropping operation 709 according to the estimation in operation 708, for example to compensate for a difference between predicted and actual ROI at the destination within the tolerance of threshold TH. In other words, the VROI is larger in order to allow for precise cropping and warping of the image to be presented to destination user. An example of this cropping is shown in FIG. 9 in which the solid rectangle 901 indicates the predicted ROI, and the outer dotted line 902 corresponds in width to the threshold TH and indicates the maximum difference between predicted and actual ROI or the difference between predicted and actual orientation or LOS within which it is possible to display an image corresponding to the actual LOS at the destination. The dark dotted line 903 indicates the result of further cropping to compensate for a difference D which is within the threshold.

According to some embodiments of the invention as described with reference to FIGS. 1A-1E and 2A-2C, a client system 800 may implement an optional 3D graphic process at operation 812 which may generate and update a virtual graphic image that represents and simulates the existence and behavior of the source user 1, for example by simulating the direction of gaze of a user 1 of server system 700, in the coordinate system of the client system 800. The virtual graphic image such as image 1', may be displayed as a graphic overlay in a display of client system 800. Thus a client system 800 may construct a merged display using extracted data received from the server source system 700, and the line of sight or orientation as measured for operation 816, combined with the virtual graphic image or display model 813. The client system 800, may display to the user the VROI, which was sent by the server source 700 in response to the client system 800 request 816 based on the orientation data, the rate of orientation and the related time tag.

It may be appreciated by a person skilled in the art, that in cases of extremely fast movements or unpredicted movement, round trip delays in the communication channel or inaccuracy in prediction of position or orientation may mean that the transmitted VROI does not correspond to the current orientation. For example, the margin determined in operation 708 may not be sufficient to enable viewing the ROI corresponding to the current position or orientation if the difference in orientation is greater than the threshold TH. In other words, the margin corresponds to a threshold outside of which insufficient image data was transmitted in operation 714 to display the ROI to the destination user 2. In such a case, the construction process 814 make use of the most updated version on storage of 360° sphere image 805, and presents the user with the corresponding ROI cropped from that image.

Thus in some systems and methods according to the invention, the predicted and actual position and/or orientation of the destination user at the time of receipt of a cropped sequence of video images may be compared, and if the difference is below a predetermined threshold, the received cropped sequence of video images may be displayed to the destination user, optionally transformed to compensate for movements of said at least one video image capturing device during capturing of video images. It will be appreciated that such a transformation may not be required if the destination user was not moving and therefore according to some embodiments of the invention motion telemetry captured at the source may be analyzed to determine whether such a transformation is necessary. If the difference in orientations is above a predetermined threshold, displaying to said destination user a previously stored image corresponding to said actual orientation. In some possible use cases of embodiments of the invention, the range of tiles or cropped images received at operation 801 may be sufficient for updating a wide field of view store without the need for a full field of view image to be transmitted. Thus in some embodiments, where the difference between predicted and actual position and/or orientation is greater than the threshold, a previously received cropped image or an image reconstructed from previously received cropped images may be displayed to a destination user.

The functions of controller 116 or 216 and data communication unit 114 or 214, or the function of database 150, may be implemented in any known computing system, one example of which is described for completeness with reference to FIG. 10.

Computing device 1000 may include a controller 1005 that may be, for example, a central processing unit processor (CPU), a chip or any suitable computing or computational device. Thus controller 1005 may perform the function of either controller 116 or controller 216. Computing system 1000 may further comprise an operating system 1015, a memory 1020, a storage 1030, an input devices 1035 and an output devices 1040. Thus the CPU may perform the function of any of the processors mentioned herein.

Operating system 1015 may be or may include any code segment designed and/or configured to perform tasks involving coordination, scheduling, arbitration, supervising, controlling or otherwise managing operation of computing device.

Memory 1020 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1020 may be or may include a plurality of, possibly different memory units.

Executable code 1025 may be any executable code, e.g., an application such as the server or client applications described above, a program, a process, task or script. Executable code 1025 may be executed by controller 1005 possibly under control of operating system 1015. Where applicable, executable code 1025 may carry out operations described herein in real-time. In some embodiments, more than one computing device 1000 may be used. For example, a plurality of computing devices that include components similar to those included in computing device 1000 may be connected to a network and used as a system.

Storage 1030 may be or may include, for example, a hard disk drive, a floppy disk drive, a Compact Disk (CD) drive, a CD-Recordable (CD-R) drive, a universal serial bus (USB) device or other suitable removable and/or fixed storage unit. Thus for example intermediate storage 703 in a server or storage of 360° sphere image 805 in a client may be comprised in storage such as storage 1030. Images may be stored in storage 1030 and may be loaded from storage 1030 into memory 1020 where it may be processed by controller 1005.

Input devices may include camera 110 (210), audio array 115 (215) a global positioning system (GPS) 112 (212), inertial measurement unit (IMU) 113 (213) or any other input device. A headset according to embodiments of the invention may include a touch input device or other user interface. Output devices 1040 may include display 111 (211), speakers, 360 audio array 115 (215) and/or any other suitable output devices.

Planning a Telepresence Journey

Figure 11:
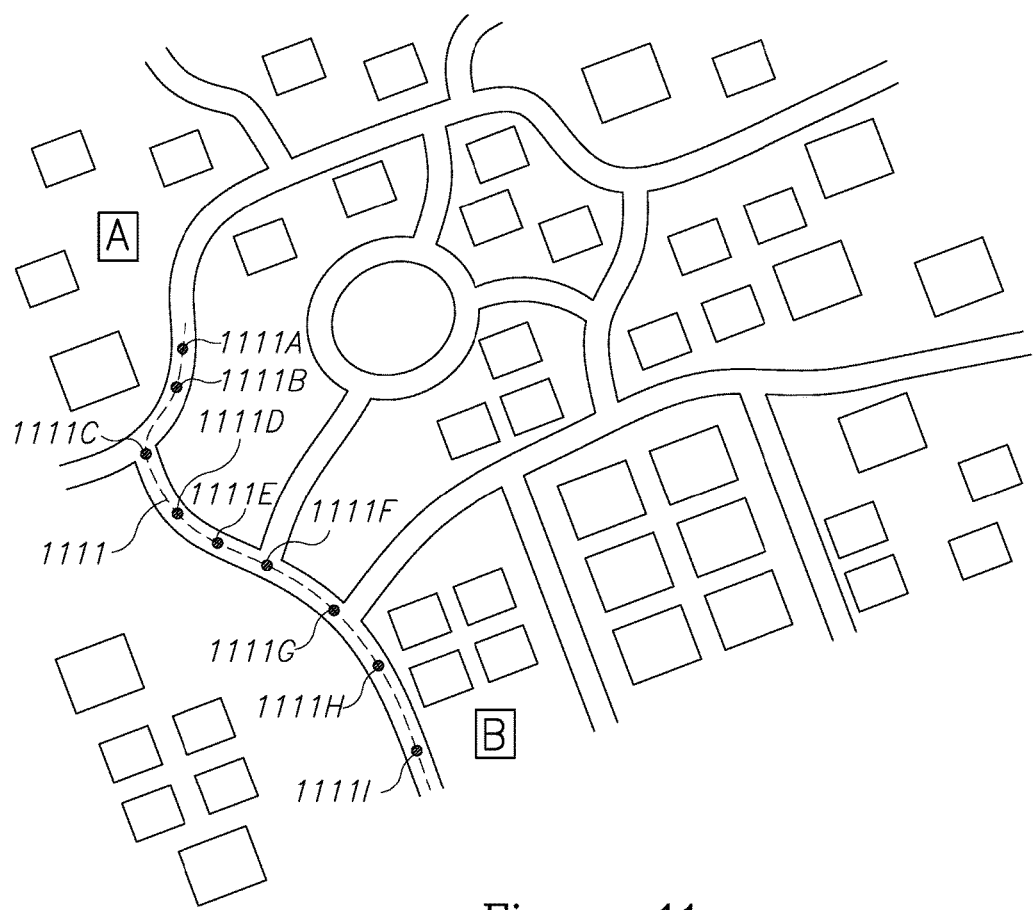
FIG. 11 is a map diagram illustrating yet another aspect of some embodiments of the invention.

FIG. 11 shows how the system of FIG. 1 may use additional media such as images and audio from any number of supplementary sources. For example, a plurality of source users in a town where the destination user wants to go from A to B and the chosen route is the dashed line.

Thus according to some embodiments of the invention a destination user 2 may wish to plan a "telepresence journey" which adds the position dimension to the orientation that has been described above in detail. The journey will be carried out along dashed line which he wishes to explore (the tour can be either in real-time or off-line). In response, the data communication unit serving destination user 2 may "hop" between sources 1111A to 1111I so the entire journey can be covered. During the journey, destination user 2 may use all the functionality of choosing the line of sight with a respective source user, as explained above.

In some embodiments, the 1111A to 1111I may be selected as the most suitable and available source users that comply with the planned journey. Hopping between uses may be by finding the point in least the least changes are likely to appear on the generated video. Similarly, the journey may be along 1111A to 1111I indicating point of interest (as opposed to source users) and they are then regarded as stationary and the journey is planned by closest and available source users.

In addition, hopping may be based according to other various criteria. Such criteria might include image and/or sound quality, or visibility or audibility of features in the field of view that are of particular interest to the destination user 2. The data communication unit may receive media sequences such as images or audio in real time from multiple sources and select between them, or a data communication unit may request media from a source such as a camera in headset 11 or 31 according to requests received from the destination user, for example via data communication unit 214.

According to some embodiments of the invention, if sufficient sources are available, a data communication unit may receive requests for media e.g. to view a video image of a particular location, without reference to any particular source. In other words a one-to-one relationship between a source user and a destination user is not essential in such embodiments. A request to view images or receive other media may be source agnostic. Data communication unit 214 or a data communication unit 125 in server 120 for example may receive requests to view video images of a particular location and select between available sources. The destination user may then control his own virtual tour of an area, for example in terms of the speed and direction or both. The control may be achieved through the use of any known device such as a joystick, and a data communication unit may select between sources according to the location in each request from the destination user 2.

Eliminating Obstructed View Via Telepresence

FIG. 12A illustrates a vehicle 1270 having the system per some embodiments as detailed embedded thereon. Specifically, all components of the source side and in particular, image capturing devices 1275 and 1276 capable of capturing a wide angle (possibly 360°) of the scene may be attached to the outside of the vehicle. Additionally, a user 1260 within the vehicle, possibly the driver wears the destination head mounted display (HMD) 1265. Destination HMD is preferably a see-through AR device that receives in real-time image portions captured by the source side devices 1275 and 1276 (and processed as explained in detail above) wherein these images are used to complete the missing portions obstructed field of view 1292A optically viewed by user 1260 by the obstructing objects such as windshield frame 1290A and any other obstructing object. As can be seen, a pedestrian 1294A is partially obstructed by windscreen frame 1290A. The processing unit is configured to receive the location on the HMD optical field of view 1292A where the obstructing objects 1290A are located (in pixel terms) and crop the respective portions from the panoramic view captured by the wide angle capturing devices 1275 and 1276. Then the cropped portions are projected into the AR HMD in a seamless manner so that the entire portion of the pixels that was previously obstructed and indicated by frame 1290B on presented field of view 1292B is being imported from the images captured outside of vehicle 1270 so that pedestrian 1294B is no longer obstructed. Advantageously this feature can be used to augment the driving experience in a scenic view and can be also transmitted to remote users or other passengers within the vehicle.

In order to achieve a seamless projection of the portions completing the obstructed portions into the scene viewed directly via headset 1265, it is important to know the location of headset 1265. This position and orientation is recorded and held in all times. Similar position and orientation is kept for the image capturing devices 1275 and 1276.

Advantageously, a comprehensive complete and unobstructed view of the scene can be produced as it taken from outside the vehicle and provided to the user located within it.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not to be construed that there is only one of that element unless otherwise stated.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A system for sharing media captured by at least one media capturing device mounted on a source entity and having a wide field of view at a source location, with a destination entity at a location other than the source location, said system comprising a data communication unit comprising one or more computer processors configured to:
   receive in real time said media and respective positions and orientations thereof, captured by the at least one media capturing device at said source location;
   receive at least one request, from a destination entity equipment, to consume media captured at said source location, wherein the at least one request includes a pointing vector of said destination entity, as derived by an orientation sensor of said destination entity;
   map the at least one request to a respective at least one region of interest of said destination entity based on said pointing vector; and
   crop said media based on the respective region of interest and further based on said respective positions and orientations, to yield cropped media,
   wherein the data communication unit further comprises a transmitter to transmit the cropped media to the destination entity.

2. The system according to claim 1, wherein the at least one media capturing device with a wide field of view cover 360°.

3. The system according to claim 1, wherein the data communication unit is configured to lock, in world coordinates the cropping to any of pan, tilt and roll of any of: a pointing vector of the source entity, a predefined vector in a specified direction in world coordinates.

4. The system according to claim 1, wherein said one or more computer processors is configured to receive additional images of said source location from a source other than said at least one media capturing device and use said additional images to augment the media transferred to said destination entity.

5. The system according to claim 4, wherein said at least one media capturing device is comprised in a user wearable device and wherein said additional media is received from media capturing devices in additional wearable devices.

6. The system according to claim 5, wherein said one or more computer processors is configured to select from media captured by different media capturing devices in response to a selection, to yield a media selection, wherein said media selection is based on any one or more of: media quality, media content.

7. The system according to claim 4, wherein the additional media is received from a database of previously stored media of said source location.

8. The system according to claim 1, wherein said at least one media capturing device is comprised in a source entity wearable device including a source entity display and the one or more computer processors comprise displaying on said source entity display a virtual graphic image of said destination entity.

9. The system according to claim 8, wherein said one or more computer processors are configured to receive an instruction to display said virtual graphic image of said destination entity within the source location, and in response, display on the source entity display, portions of the virtual graphic image of said destination entity that are covered by a pointing vector of the source entity wearing the source entity display.

10. The system according to claim 8, wherein said one or more computer processors are configured to receive an instruction to display said virtual graphic image of said destination entity within the source location in which a plurality of source entities each having a respective source entity display, and calculate, in response, a location within the source location, which minimizes pointing vector obstruction based on locations of the source entities and pointing vector thereof.

11. The system according to claim 8, wherein the one or more computer processors are configured to receive signals from one or more sensors sensing a movement of one or more limbs of said destination entity and animating said virtual graphic image representing said destination entity to imitate said movement.

12. The system according to claim 8, wherein the one or more computer processors are configured to receive signals from one or more sensors sensing a movement of one or more limbs of said destination entity and control an input device at the source location based on said movement.

13. The system according to claim 8, wherein the one or more computer processors are configured to: instruct the at least one media capturing device at said source location to capture media of a physical object located at the source location, generate a 3D model of said physical object based on the captured media; present the 3D model to the destination entity; and modify the presented 3D model based on input by the destination entity.

14. The system according to claim 1, wherein said destination entity equipment comprises a destination entity display and wherein the one or more computer processors are configured to display on said destination entity display, a virtual graphic image representing said source entity.

15. The system according to claim 1, wherein the one or more computer processors are configured to predict the region of interest by predicting an orientation of the destination entity at a time of receipt of the cropped media based on tracking movement of said destination entity.

16. The system according to claim 14, wherein the one or more computer processor are configured to compare the predicted and actual orientation of the destination entity at a time of receipt of the cropped media, and in a case that a difference in said predicted and actual orientations is below a predetermined threshold, transform the received cropped media to compensate for movements of said at least one media capturing device during capturing of media and display the transformed cropped media to the destination entity.

17. The system according to claim 14, wherein the one or more computer processors are configured to compare the predicted and actual orientation of the destination entity at a time of receipt of the cropped media, and in a case that a difference in said predicted and actual orientations is below a predetermined threshold, display to said destination entity a previously stored media corresponding to said actual orientation.

18. The system according to claim 1, wherein the one or more computer processors are configured to instruct storing media every specified time stamp and to retrieve stored media in a case that real time media are not available from the media capturing device at said source location.

19. A method of sharing media, captured by at least one capturing device mounted on a source entity and having a wide field of view at a source location, with a destination entity at a destination location other than the source location, said method comprising:
 receiving in real time media and respective positions and orientations thereof, captured by the at least one media capturing device at said source location;
 receiving at least one request, from a destination entity equipment, to consume media captured at said source location, wherein the at least one request includes a pointing vector of said destination entity, as derived by an orientation sensor of said destination entity;
 mapping the at least one request to a respective at least one region of interest of said destination entity based on said pointing vector;
 cropping said media based on the respective region of interest and further based on said respective positions and orientations, to yield cropped media; and
 transmitting the cropped media to the destination entity.

20. A non-transitory computer readable medium for sharing media, captured by at least one media capturing device mounted on a source entity and having a wide field of view at a source location, with a destination entity at a location other than the source location, the computer readable medium comprising a set of instructions that when executed cause at least one computer processor to:
 receive in real time media and respective positions and orientations thereof, captured by the at least one media capturing device at said source location;
 receive at least one request, from a destination entity equipment, to consume media captured at said source location, wherein the at least one request includes a pointing vector of said destination entity, as derived by an orientation sensor of said destination entity;
 map the at least one request to a respective at least one region of interest of said destination entity based on said pointing vector; and
 crop said media based on said regions of interest and further based on said respective positions and orientations, to yield cropped media; and instruct a transmission of the cropped video images to the destination entity.

\* \* \* \* \*